June 19, 1962 P. E. SCHREINER ETAL 3,039,626
MAT HANDLING MACHINE
Filed July 28, 1959 14 Sheets-Sheet 1
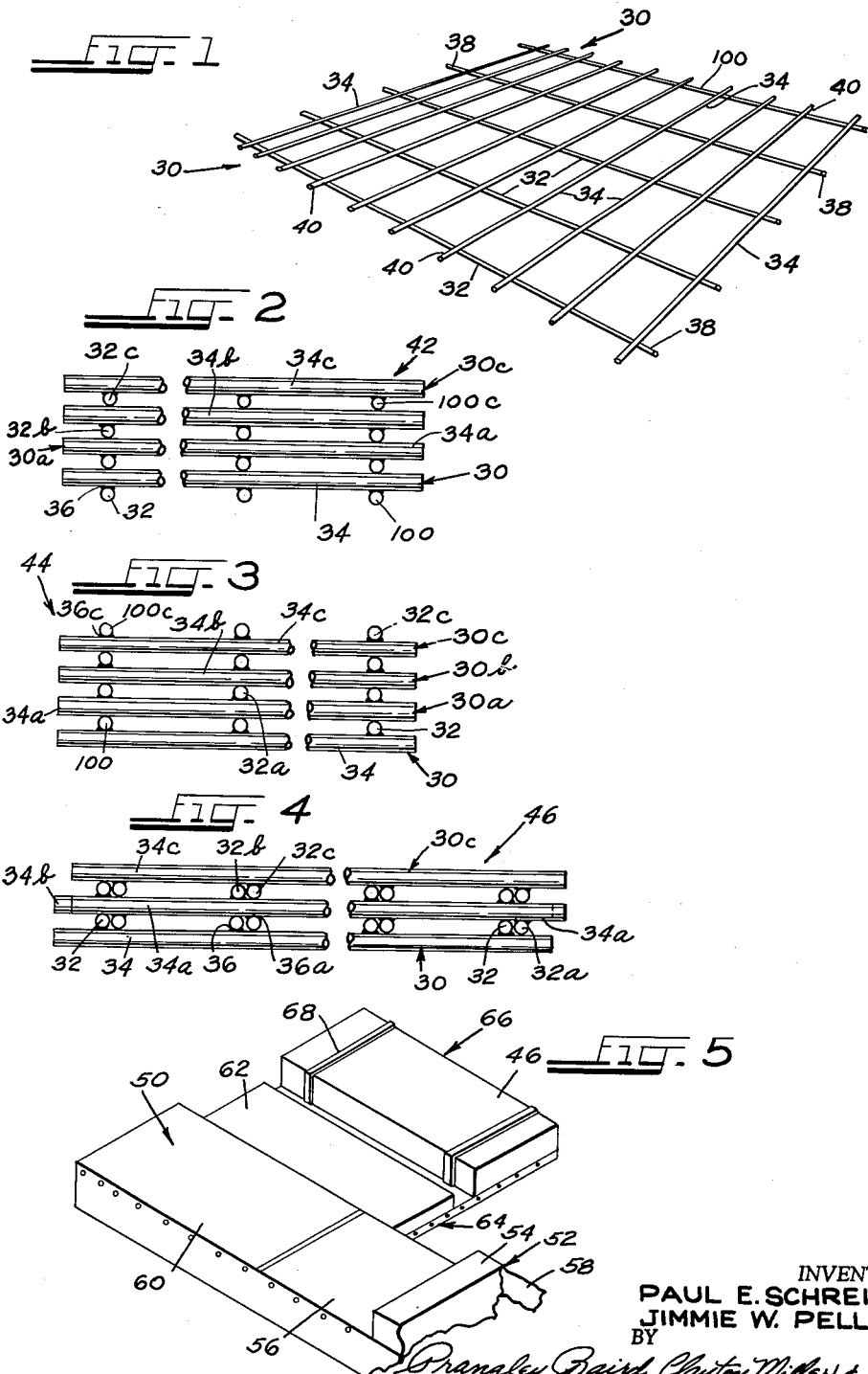
INVENTORS:
PAUL E. SCHREINER
JIMMIE W. PELL
BY

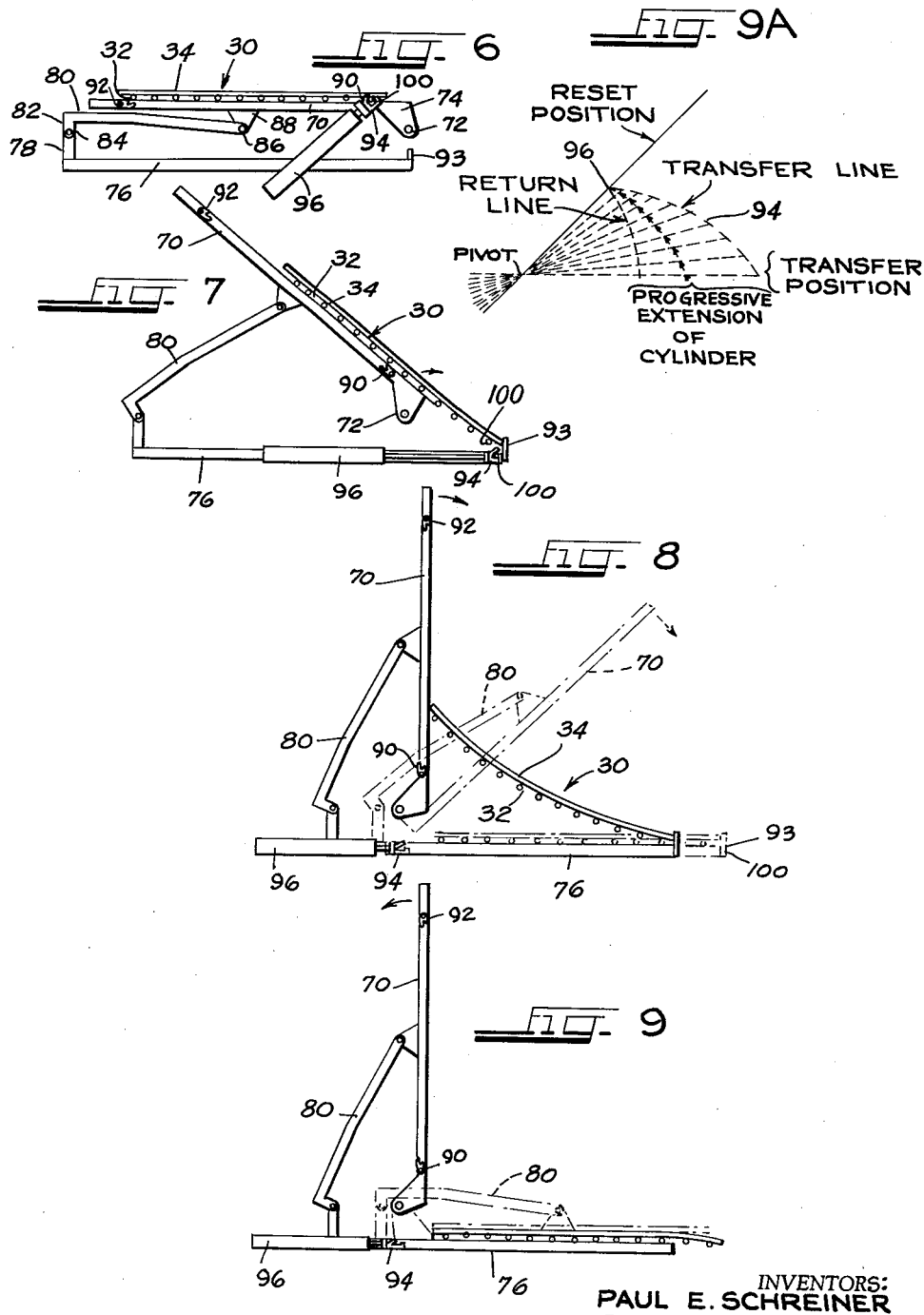

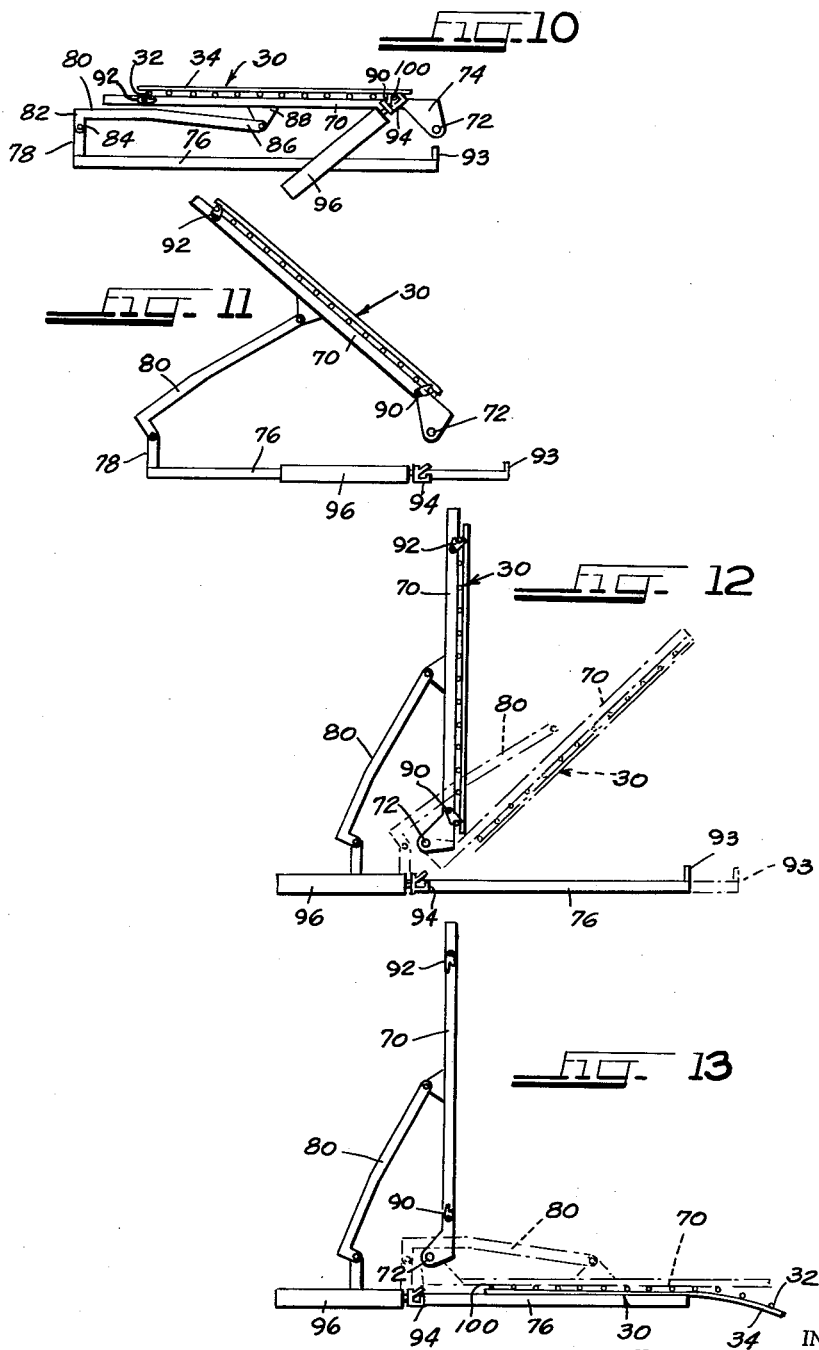

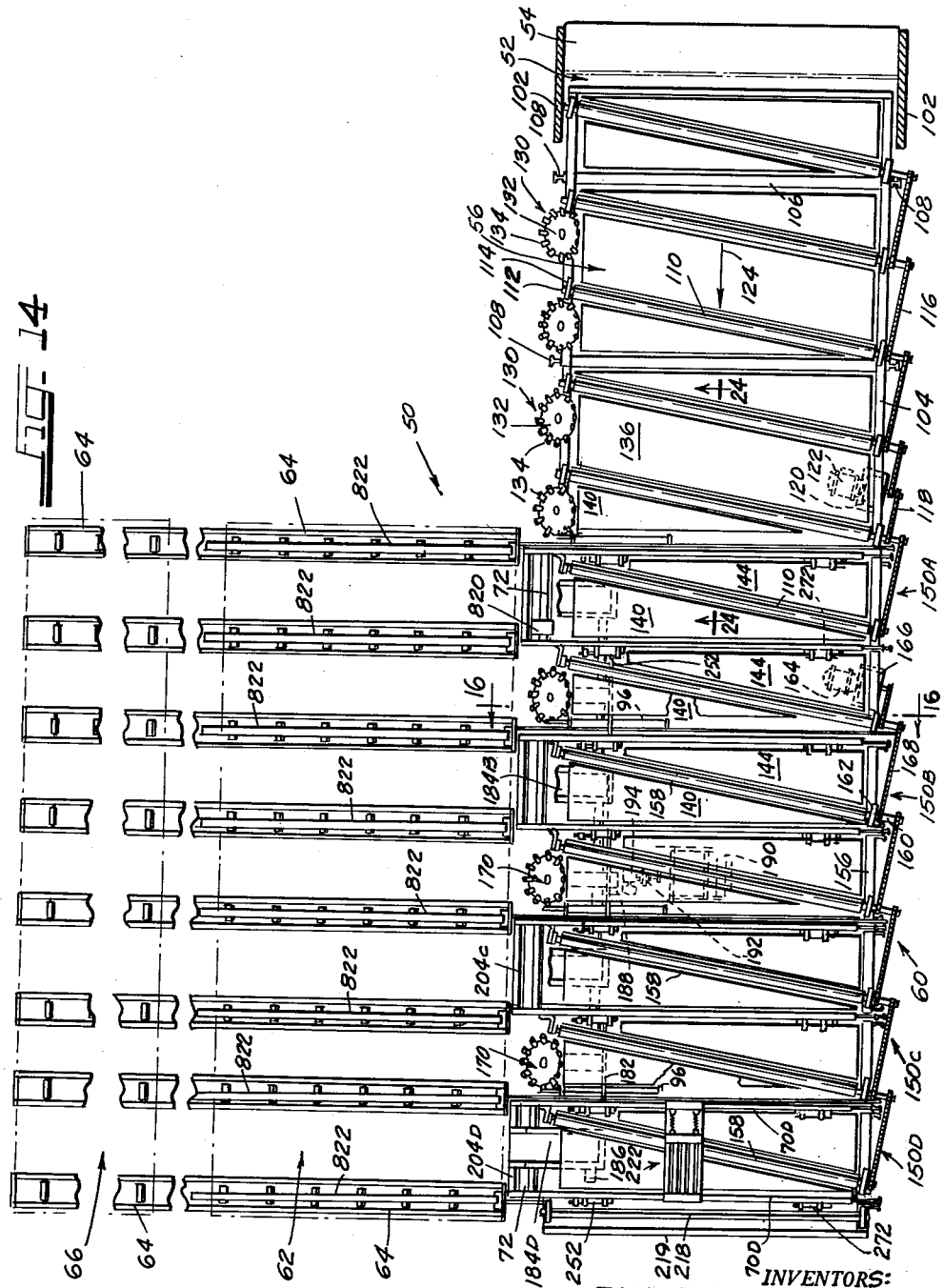

June 19, 1962 P. E. SCHREINER ETAL 3,039,626
MAT HANDLING MACHINE
Filed July 28, 1959 14 Sheets-Sheet 5
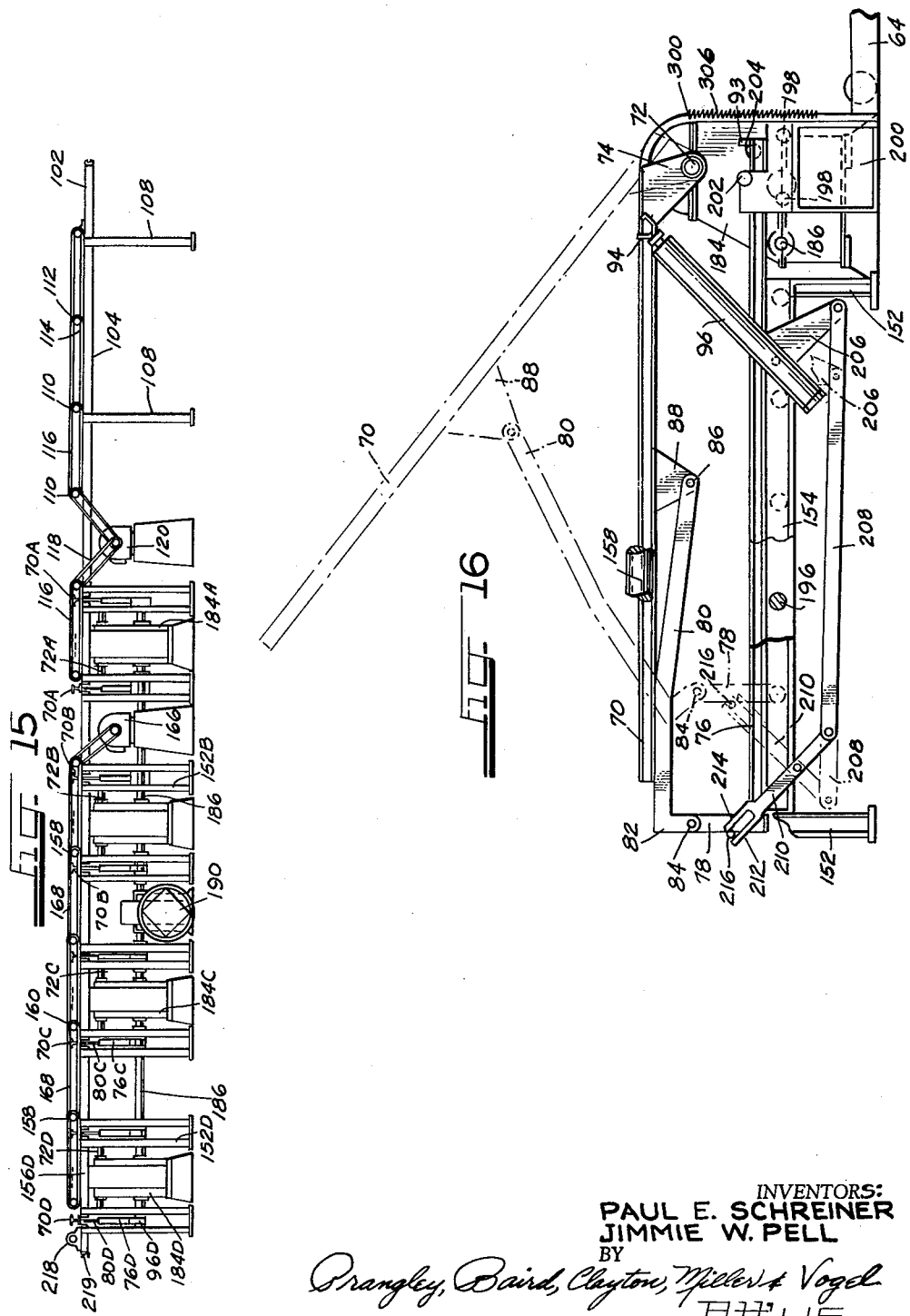
INVENTORS:
PAUL E. SCHREINER
JIMMIE W. PELL
BY
Prangley, Baird, Clayton, Miller & Vogel
ATT'YS.

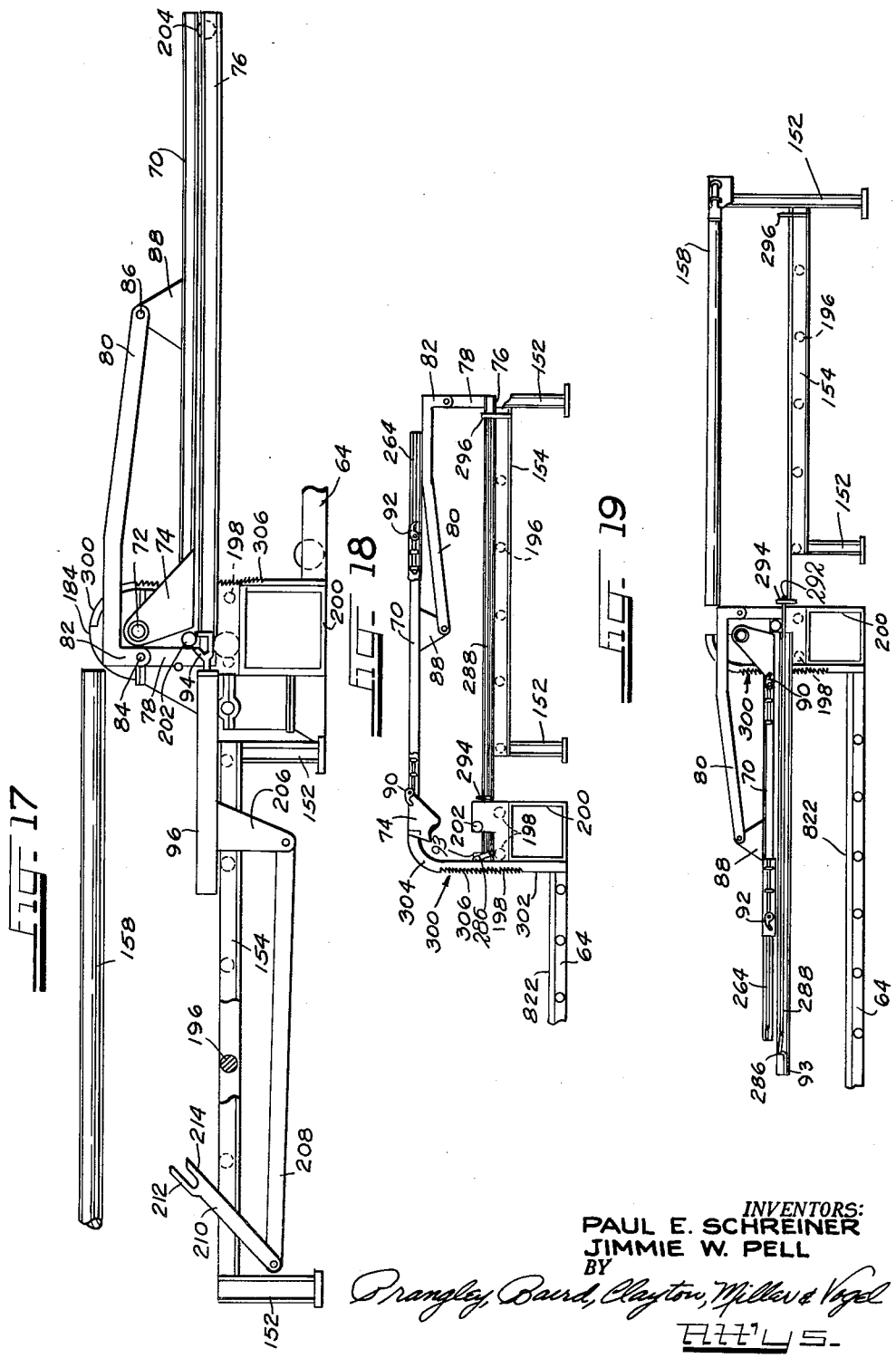

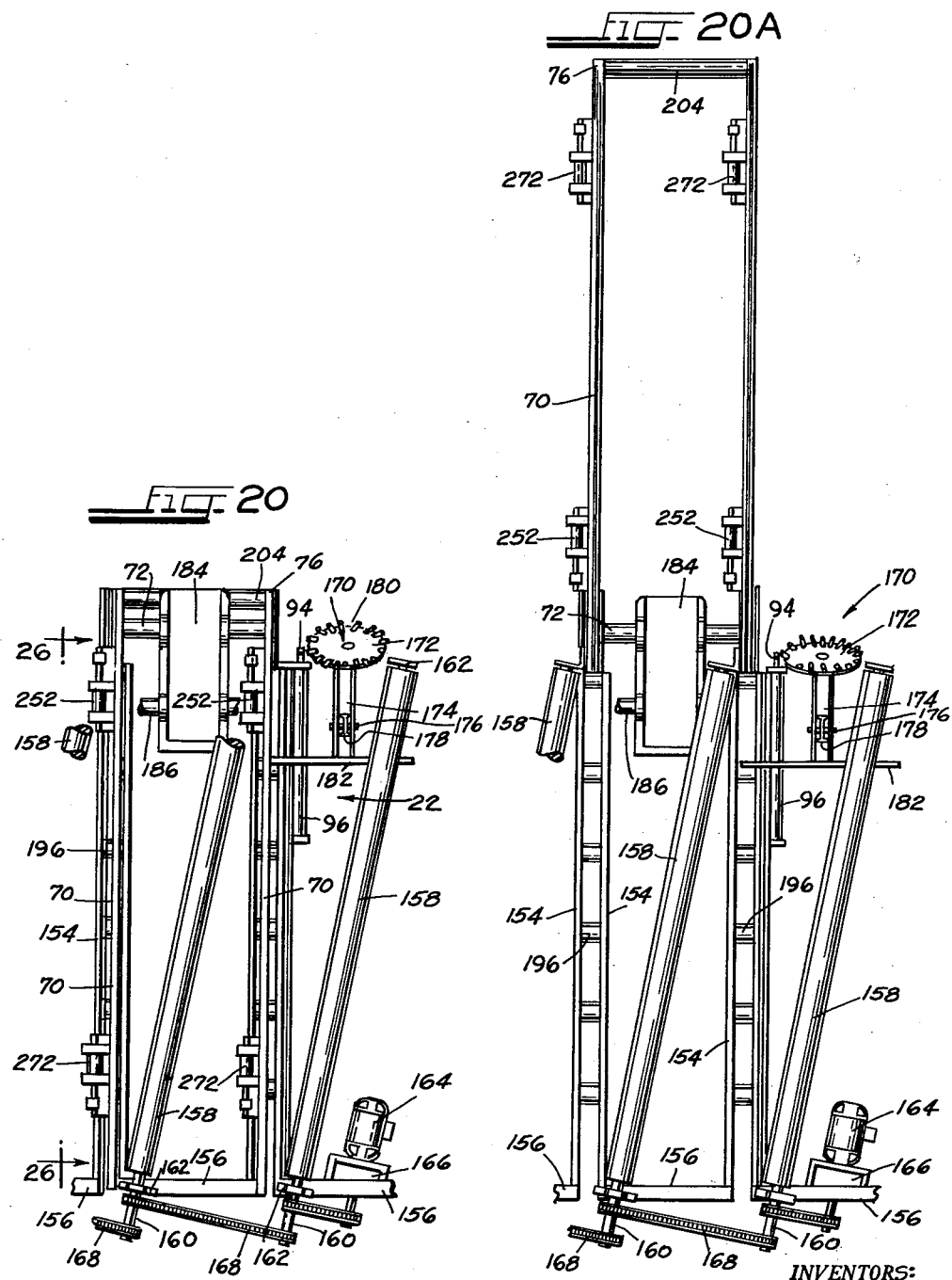

June 19, 1962 P. E. SCHREINER ETAL 3,039,626
MAT HANDLING MACHINE
Filed July 28, 1959 14 Sheets-Sheet 8
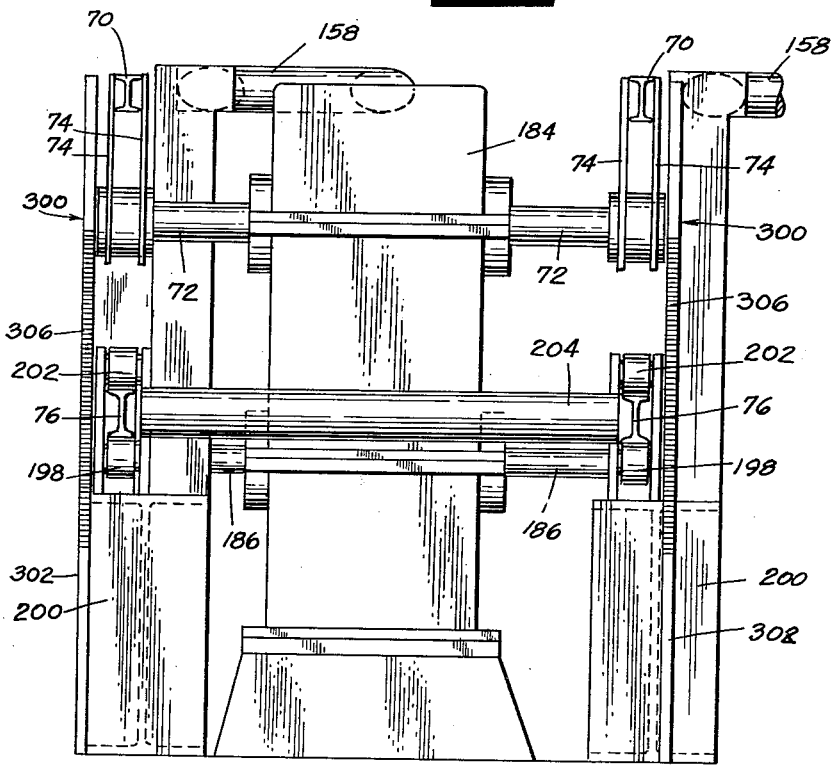
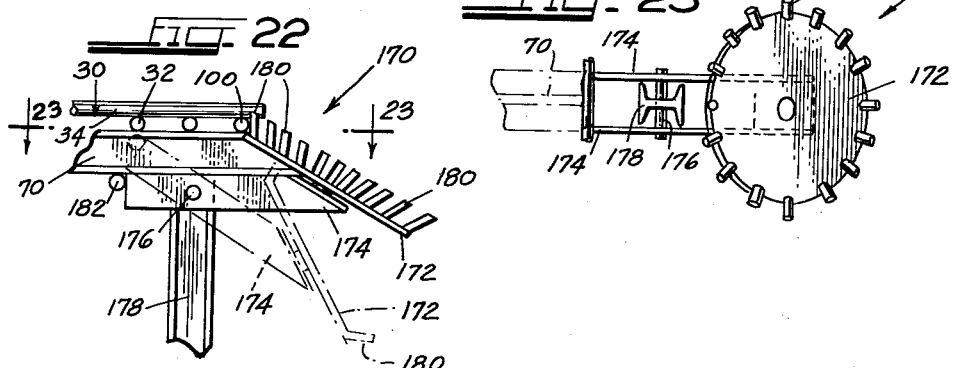
INVENTORS:
PAUL E. SCHREINER
JIMMIE W. PELL
BY

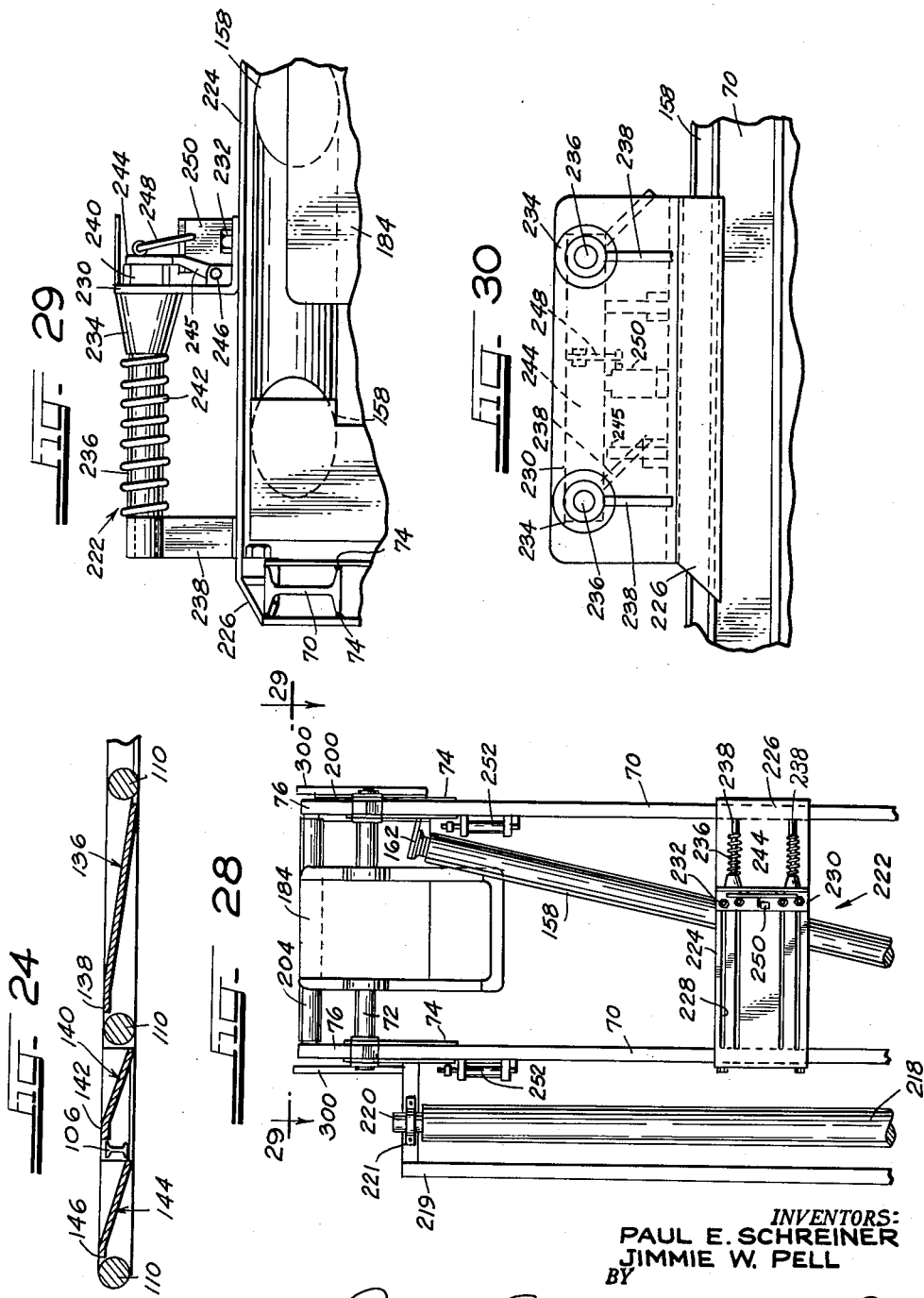

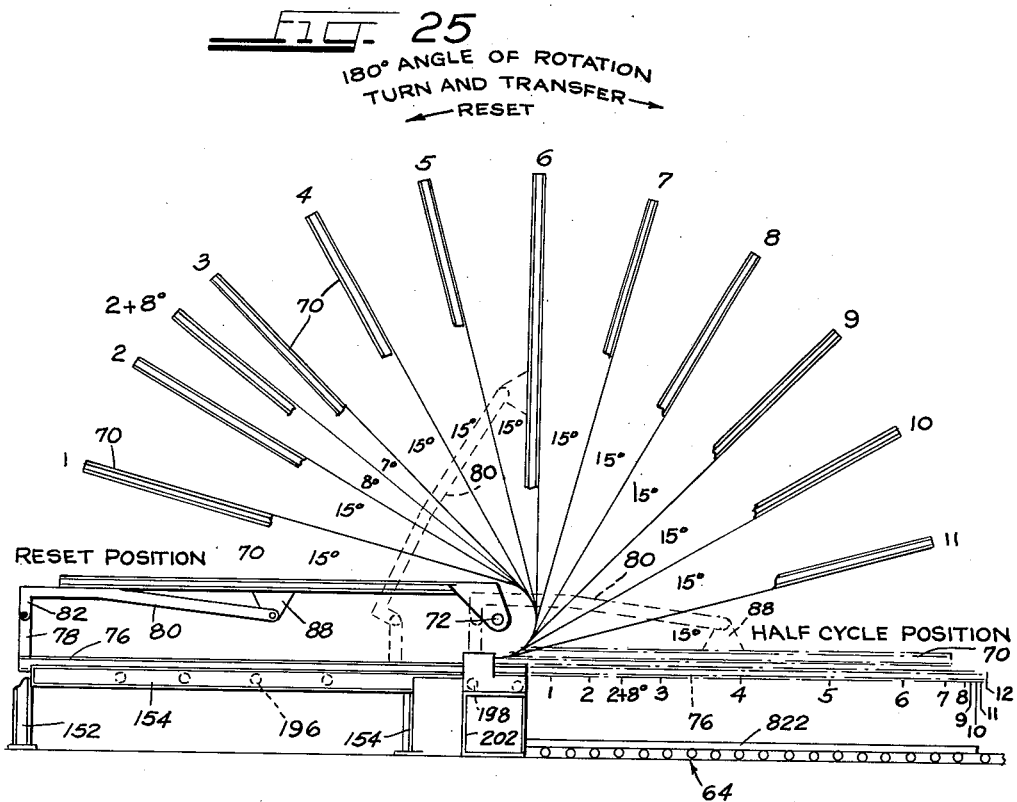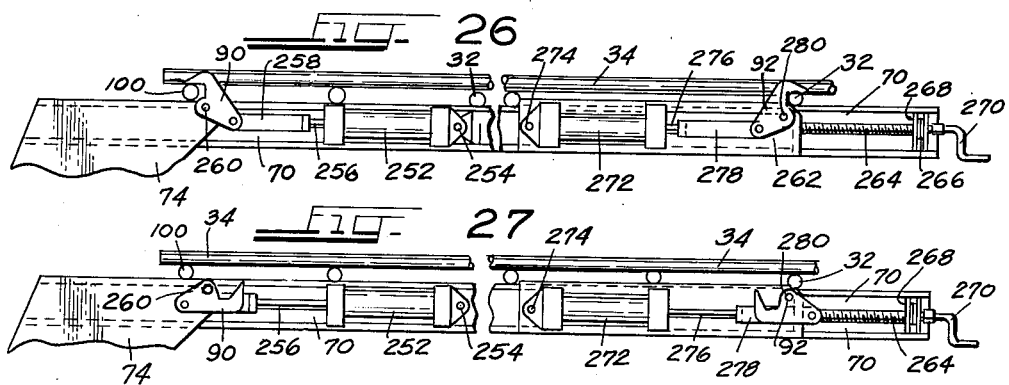

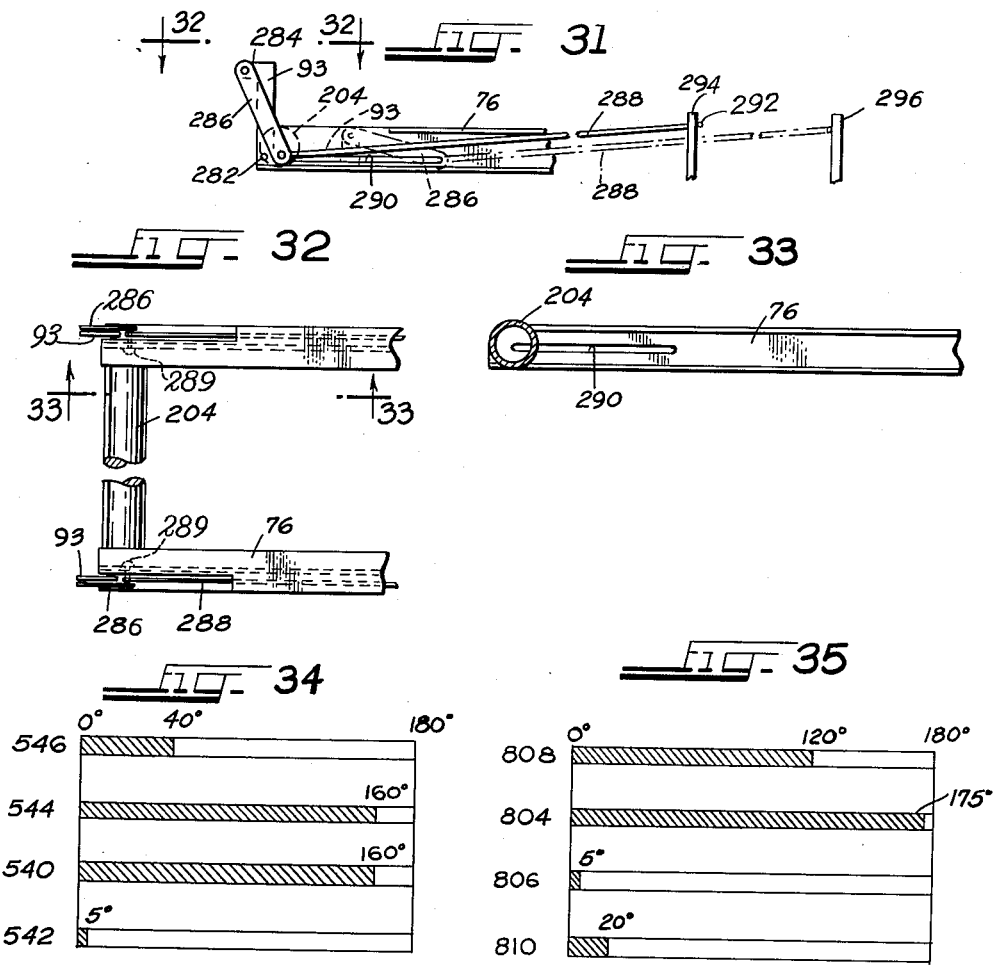

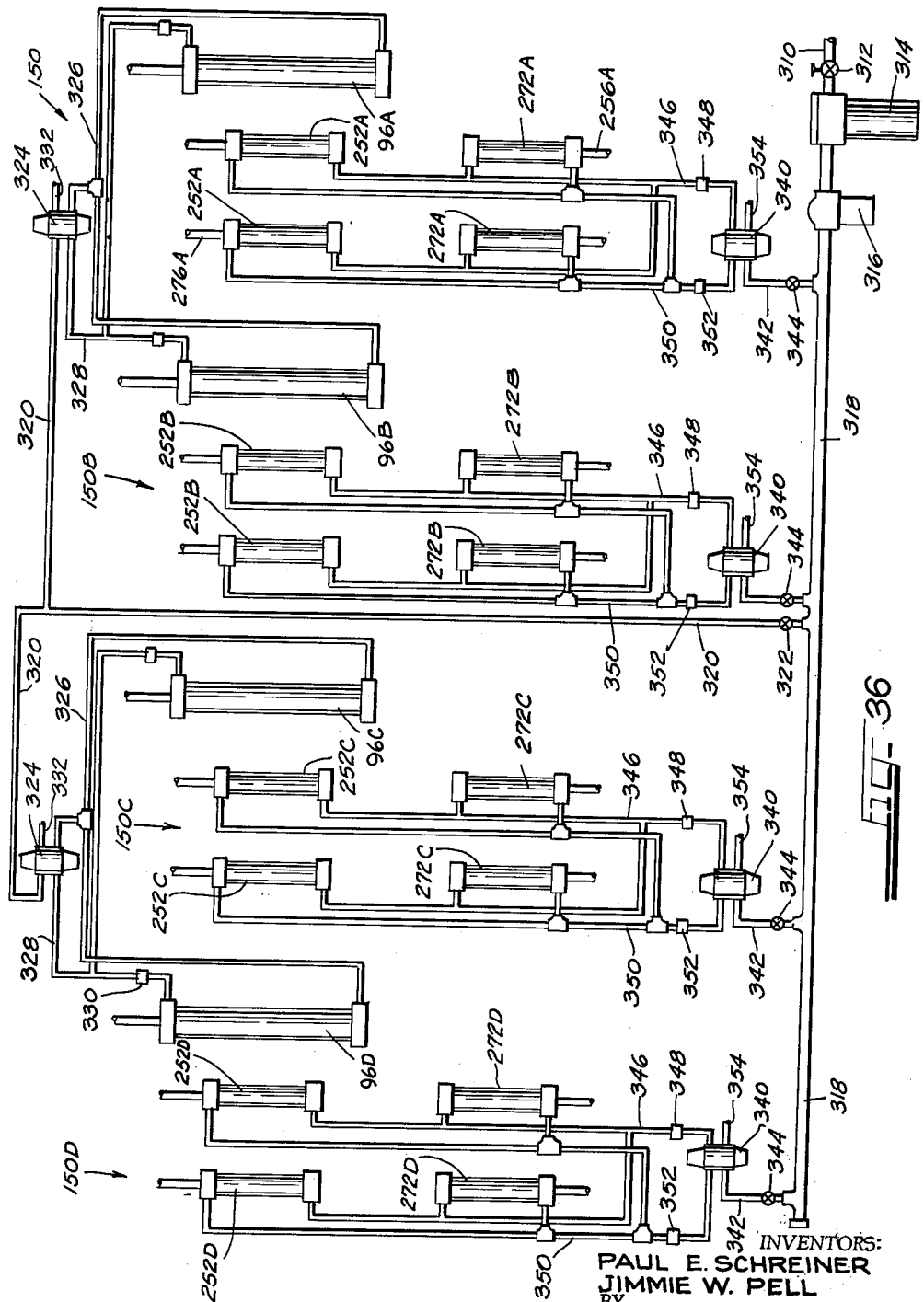

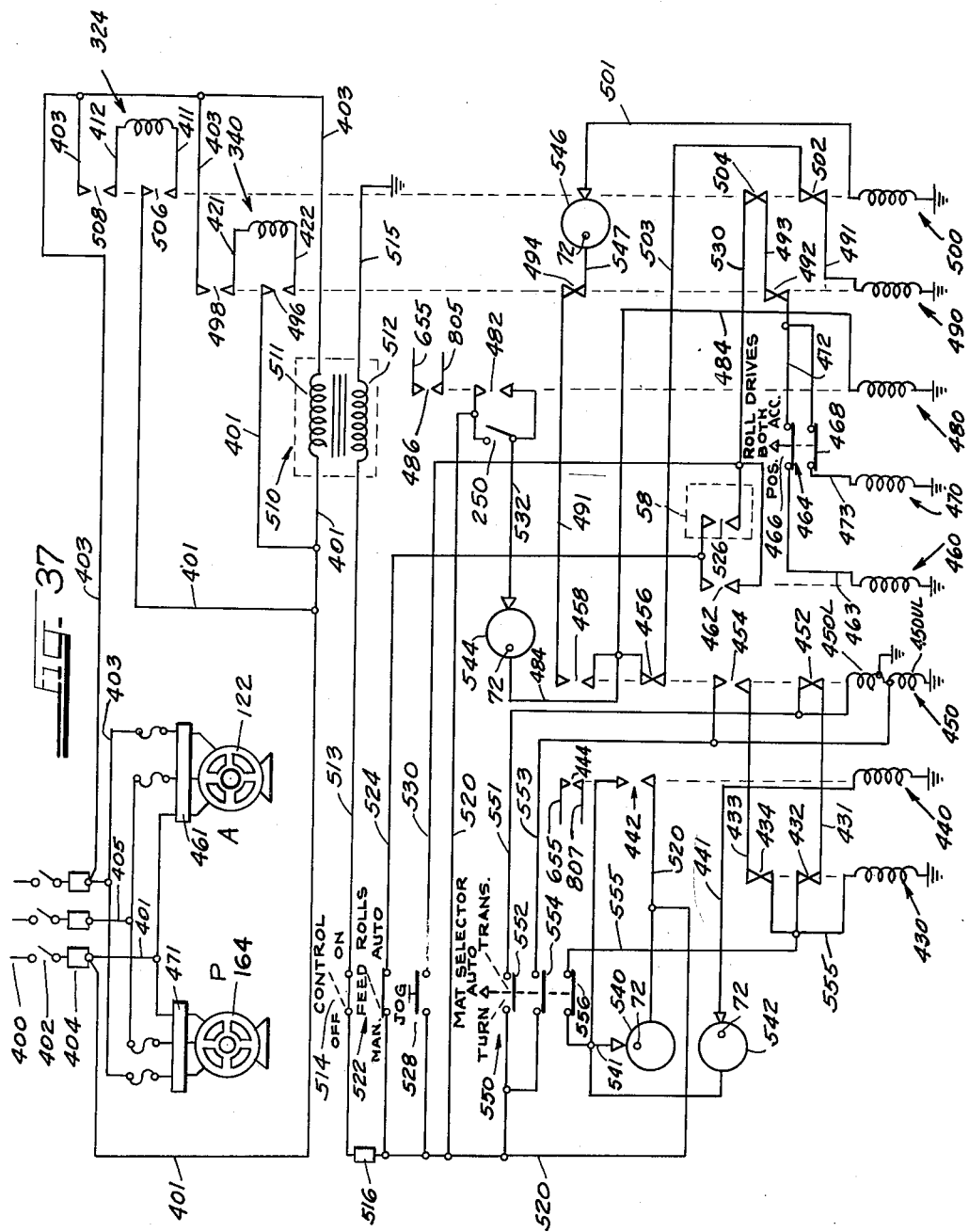

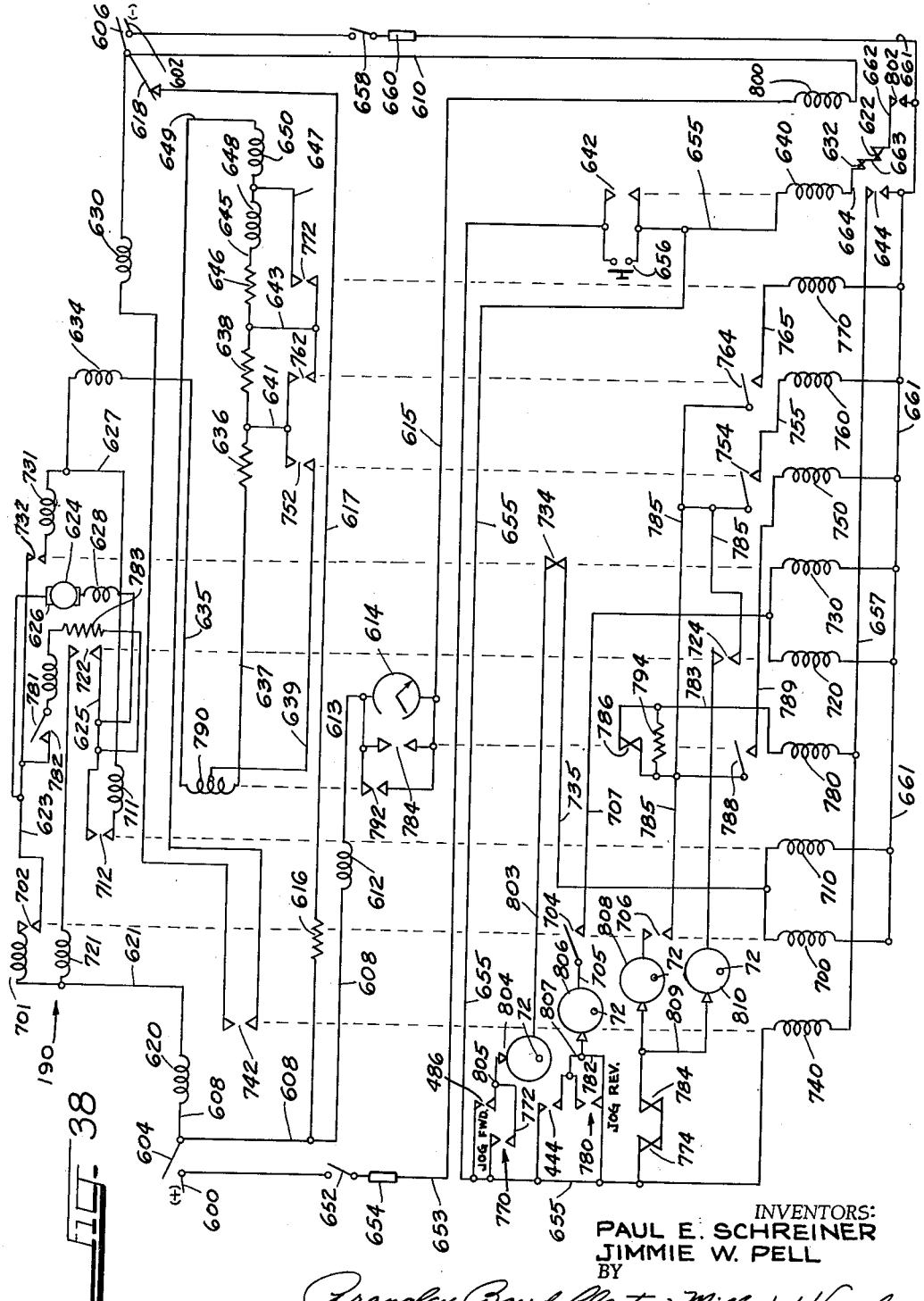

United States Patent Office 3,039,626
Patented June 19, 1962

3,039,626
MAT HANDLING MACHINE
Paul E. Schreiner and Jimmie W. Pell, Kokomo, Ind., assignors to Continental Steel Corporation, Kokomo, Ind., a corporation of Indiana
Filed July 28, 1959, Ser. No. 830,110
41 Claims. (Cl. 214—6)

This invention relates to methods and apparatus for handling metal fabric and particularly to methods and apparatus for transferring, turning, and stacking reinforcing metal fabric mats and the like.

There is a substantial demand for metal fabric and particularly for metal open mesh mats such as the type used for reinforcing concrete highways and consisting of a plurality of parallel and spaced-apart line wires which extend longitudinally of the mat and a plurality of parallel and spaced-apart cross wires disposed transversely of the mat and welded to the line wires. Automatic machines are available for the continuous fabrication of such mats including the provision of the line wires and the cross wires from large coils of wire and the automatic positioning and welding of the line wires and the cross wires to each other. In the last step of the operation of the usual welding machine for making welded steel mats, the completed mat is severed from the rolls of wire from which the constituent wires thereof are obtained, after which the completed mat is transferred to a stacking station. It has been customary heretofore manually to stack the mats and this operation has required the services of two or three men, and perhaps more as the size and weight of the mats increases. In many instances it is desirable to stack the mats in a nesting or interfitting relationship with each other whereby alternate mats are turned so that the cross wires of one mat will nest and interfit with the cross wires of the mat lying therebeneath or, alternatively, the line wires of the upper mat will nest and interfit with the line wires of the lower mat. Such a stack of mats, in which alternate mats have been turned, occupies substantially less vertical space than would otherwise be required and, furthermore, an interlocking relationship among the mats is created which lends stability to the stack of the mats during storage and shipment. After stacking, the stack of mats may be suitably secured by metal strapping or other means. In addition to stacking the mats, it is necessary upon occasion to replace a rejected or defective mat, and also during the set-up of the welding machine it may be necessary selectively to control the orientation of the mats being stacked. Such manipulation of the mats has been possible heretofore only when the mats were handled manually.

Accordingly, it is an important object of the present invention to provide an improved method and apparatus for handling metal fabric such as welded reinforcing mats.

Another object of the invention is to provide an improved apparatus for stacking metal fabric mats in which alternate mats are turned whereby to produce a stack of mats which nest and interfit one with another.

Yet another object of the invention is to provide an apparatus for stacking metal fabric mats which will automatically stack the mats at a relatively high operating speed so that the stacking apparatus may be used directly in conjunction with an automatic continuously operating fabric producing machine for operation therewith at high production rates.

Still another object of the invention is to provide an apparatus of the type set forth which can selectively turn all mats handled thereby or can transfer all mats handled thereby without turning, or may alternately turn and transfer mats as desired to permit rejection and replacement of rejected mats and to facilitate machine set-up.

In connection with the foregoing object, it is another object of the invention to provide a mat turning apparatus which accomplishes all of the before mentioned operations utilizing the same basic movement of the same machine parts.

Yet another object of the invention is to provide a mat stacking apparatus of the type set forth having automatic control mechanism incorporated therewith whereby selectively to operate the stacking apparatus in the desired manner and to produce stacks of selected sizes. Still another object of the invention is to provide a mat stacking apparatus of the type set forth wherein the various operating parts thereof may be adjusted to accommodate mats having varying lengths and widths, various spacing of the wires thereof, different gauges of the wires thereof and different overhanging of the free ends of the wires. Yet another object of the invention is to provide a mat stacking machine, of the type set forth, that is adapted to be used with a take-up reel when producing metal fabric in roll form.

Still another object of the invention is to provide an improved mechanism for feeding fabric mats along a predetermined path and, particularly, feeding mats that have overhanging ends on the wires forming the mat.

A further object of the invention is to provide an improved method of automatically transferring, turning and transferring, and automatically alternately transferring and turning mats selectively, whereby to form different types of stacks of the mats. A still further object of the invention is to provide an improved method of feeding metal fabric mats having overhang on the ends of the wires forming the mats.

These and other objects and advantages of the present invention will be better understood from the following description when taken in conjunction with the accompanying drawings. In the drawings, wherein like reference numerals have been utilized to designate like parts throughout:

FIG. 1 is a perspective view of a metal fabric mat of the type adapted to be handled and stacked by the method and apparatus of the present invention;

FIG. 2 is an end view of a representative stack of mats which may be built up by use of the present invention, each mat having been transferred from a mat forming machine and placed on top of the preceding mat;

FIG. 3 is an end view of a similar stack of metal fabric mats in which each of the mats has been turned as it comes from the mat forming machine; so that the bottom side of each mat is directed upwardly;

FIG. 4 is an end view of a similar stack of mats in which alternate mats have been turned before transferring and stacking so as to provide a lower stack having the mats interfitting and nesting one with another;

FIG. 5 is a diagrammatic block-type view, in perspective, showing one arrangement of a mat forming machine in combination with the mat transferring mechanism, the mat stacking mechanism and a mat banding area;

FIGS. 6 to 9 are diagrammatic progressive views illustrating the operation of the apparatus of the present invention and the method thereof in transferring a mat from one position to another without turning the mat;

FIG. 9A is a diagrammatic illustration of the relationship between pivoting of the transfer cylinder and extension of the transfer finger;

FIGS. 10 to 13 are similar diagrammatic views progressively illustrating the method of operation of the apparatus of the present invention in order to turn and transfer a mat;

FIG. 14 is a plan view, with certain portions broken away, of a machine made in accordance with and embodying the principles of the present invention and showing the association thereof with the discharge end portion of a mat fabricating machine;

FIG. 15 is an elevational view of the machine of FIG. 14, substantially as seen when looking toward that portion of the machine which occupies the lowermost portion of FIG. 14, the view particularly illustrating the drive mechanism for the machine;

FIG. 16 is an enlarged view in vertical section taken through the turning mechanism of the machine of FIG. 14 substantially along the line 16—16 thereof, the parts being shown in solid lines in position to receive a newly fabricated mat thereon and being shown in broken lines in an intermediate mat transferring and/or turning position;

FIG. 17 is a view in vertical section similar to FIG. 16 but showing the parts in a half cycle position wherein the transfer slides and the turning arms of the machine are fully extended;

FIG. 18 is another vertical section taken through the machine of FIG. 14 with certain portions broken away, the parts being shown in position to receive a newly fabricated mat thereon;

FIG. 19 is a view similar to FIG. 18 but again showing the parts in the half cycle position with the transfer slides fully extended;

FIG. 20 is a plan view, with certain portions broken away, of one of the turn-transfer units of the machine of FIG. 14 and including the portion of the machine illustrated in FIG. 16, the parts being shown in position to receive a mat thereon;

FIG. 20A is a view of the parts of FIG. 20 in the half cycle position with the transfer slides and the turning arms extended;

FIG. 21 is an enlarged end view as seen from the stacking area or the upper end of the turn-transfer unit of FIG. 20;

FIG. 22 is a fragmentary enlarged side elevational view of the mat alignment control wheel of the turn-transfer unit shown in FIG. 20, the alignment control wheel being shown in solid lines in its controlling position and being shown in broken lines in its retracted or noncontrolling position;

FIG. 23 is a top plan view of the alignment control wheel as seen in the direction of the arrows 23—23 in FIG. 22;

FIG. 24 is an enlarged fragmentary view in vertical section taken along the line 24—24 of FIG. 14, illustrating the roller and deflector structure of the machine along which the mats are conveyed to the mat transferring and turning station;

FIG. 25 is a schematic cycle diagram illustrating the relative positions of the turning arms and the transfer slide during the operating cycle of the machine;

FIG. 26 is an enlarged fragmentary view of the mat locking fingers and actuating mechanism therefor mounted on the turning arms, substantially as seen when viewed in the direction of the arrows 26—26 of FIG. 20, the locking fingers being shown in the locking or mat engaging position;

FIG. 27 is a view similar to FIG. 26, but illustrating the position of the parts when the locking fingers are in their non-locking position;

FIG. 28 is an enlarged fragmentary plan view of the mat control stop assembly forming a part of the turn-transfer mechanism of FIG. 14;

FIG. 29 is an enlarged fragmentary side elevational view of the mat control stop assembly substantially as seen in the direction of the arrows 29—29 in FIG. 28;

FIG. 30 is an end view of the assembly of FIG. 29 as seen from the left thereof, the depending fingers of the stop assembly being shown at the actuating position in solid lines, and being shown in the mat transferring position in broken lines;

FIG. 31 is an enlarged view in vertical section, with certain parts broken away, of the retainer linkage structure forming a part of the present invention, the parts in solid lines being in the retaining position as illustrated in FIG. 19 and the parts in broken lines indicating the mat shifting position also illustrated in FIG. 19 of the drawings;

FIG. 32 is an enlarged plan view of the end of the transfer slide substantially as seen in the direction of the arrows 32—32 of FIG. 31;

FIG. 33 is a fragmentary view in vertical section as seen in the direction of the arrows 33—33 of FIG. 32;

FIGS. 34 and 35 are timing diagrams for cam actuated switches which form a part of the control mechanism of the present invention;

FIG. 36 is a diagrammatic view of the pneumatic control system forming a part of the control apparatus for the present invention;

FIG. 37 is a diagrammatic view of the A.C. portion of the electrical control system forming a part of the present invention; and FIG. 38 is a diagrammatic view of the D.C. portion of the electrical control circuit forming a part of the control mechanism for the present invention.

Turning now to the drawings, there is shown in FIG. 1 a metal fabric mat of the type adapted to be handled and turned by the method and apparatus of the present invention, the mat being generally designated by the numeral 30. The mat includes a plurality of line or longitudinal wires or rods 32 and a plurality of transverse or cross wires or rods 34, the cross wires 34 being connected to the line wires 32 as by welding at weld points 36 (see FIG. 2). Normally, the line rods 32 are longer than the cross rods 34 and they are arranged in parallelism with respect to each other and are equidistantly spaced across the mat 30. The cross wires 34 are likewise arranged parallel to each other and equidistantly spaced along the mat 30, the cross wires 34 being arranged at right angles to the line wires 32. Each of the line wires 32 has at each end thereof an overhang 38 and each of the cross wires 34 normally has at the ends thereof an overhang 40, the overhanging ends 38 and 40 making the handling of the mat 30 relatively difficult.

The mat 30 may be manufactured by an automatic fabric forming machine which has the wires 32 and 34 supplied thereto from suitable coils or rolls thereof. The line wires 32 are fed longitudinally through the machine and the cross wires 34 are placed transversely on top of the line wires 32 and welded thereto at the points of intersection. After the welding operation has taken place, a shear mechanism cuts the line wires 32 from the source coils thereof, whereupon the finished mat 30 is fed to a stacking station. Heretofore the finished mats have been manually stacked in the desired manner.

Referring to FIG. 2, there is shown a representative stack 42 formed of a plurality of the mats 30, the mats 30 being viewed from the end and being stacked with the line wires 32 disposed downwardly and below the cross wires 34. For the sake of convenience the suffix *a* has been added to each part of the mat disposed upon the lowermost mat, the suffix *b* has been applied to the thrid mat from the bottom in the stack 42, the suffix *c* has been applied to the fourth mat from the bottom, etc. It will be seen that the mats are positioned with the line wires 32 in general vertical alignment with each other and with the cross wires 34 likewise in vertical alignment.

In FIG. 3 there is shown a stack 44 of the mats 30 in which each of the mats has been inverted from the position normally occupied thereby immediately after formation, so that the cross wires 34 are disposed beneath the line wires 32. Again for the sake of convenience the suffix *a* has been aded to the parts of the mat placed on top of the lowermost mat on the stack 44, the suffix *b* has been applied to the mat positioned third from the bottom, etc.

When shipping and storing the mats 30, it is particularly convenient to stack the mats in the nesting and interfitting relationship which is illustrated in FIG. 4 of the drawings, the stack there being designated generally by the numeral 46. The mat disposed first upon the lowermost mat has the parts thereof designated with a suffix *a*, the third mat placed on the stack has a suffix *b* added to the parts thereof, etc. It will be seen that the mats of the stack 46 occupy a substantially smaller volume than do either of the stacks 42 and 44 shown in FIG. 2 and FIG. 3, thereby economizing in space during shipment and storage. It further will be noted that the various wires interlock and nest whereby to add stability and rigidity to the stack 46. The method and apparatus of the present invention are adapted selectively to form any of the stacks of FIGS. 2, 3 or 4 or combinations thereof.

A schematic representation of the stacking machine of the present invention and its physical relationship to a metal fabric welding machine and a banding area are illustrated in FIG. 5 of the drawings. The mat stacking mechanism of the present invention has been generally designated by the numeral 50 and has been shown in association with the output end of a fabric maufacturing machine 52, only the shear 54 of the machine 52 having been shown. As the machine 52 completes the welding of the cross wires to the line wires, the newly welded mat, while still attached to the source of the line wires, is fed to a holding and accelerating mechanism 56 forming a part of the stacking machine 50. Thereafter, the shear 54 operates in accordance with controls contained in a shear control panel 58, and those controls serve to actuate mechanism whereby to accelerate the mat disposed on the mechanism 56 and to move it onto a mat turning and transferring mechanism of the machine which is generally designated by the numeral 60. After the mat has been properly positioned on the mechanism 60, it is either transferred or turned and transferred, in accordance with pre-selected controls, to a stacking area generally designated by the numeral 62 wherein a stack such as one of the stacks 42, 44 or 46 of FIGS. 2, 3 or 4 is assembled by the mat turning mechanism 60. The stacking area may be provided with a conveyor assembly 64 which may be of either the powered or gravity type and serves to convey a completed stack of the mats to a banding and shipping area generally designated by the numeral 66, a stack such as the stack 46 of FIG. 4 being shown schematically thereon in FIG. 5 and secured by metal strapping 68 ready for shipment.

The manner in which the mat turning and transfer mechanism 60 serves to transfer a mat to the stacking area 62 without turning or inverting the mat is diagrammatically illustrated in FIGS. 6-9 of the drawings and there also is shown in those views a schematic representation of the basic operating parts of the mechanism 60. In general the mechanism 60 includes a first mat support which receives the welded mats 30 from the accelerating section 56 of the machine, the first mat support being in the form of a plurality of turning arms each generally designated by the numeral 70. The turning arms 70 are disposed transversely of the path of movement of the newly formed mat and therefore transversely to the line wires 32 and parallel to the cross wires 34. The right hand end of each of the turning arms 70, as viewed in FIGS. 6 and 7, is fixedly attached to a main turning shaft 72 by means of a bracket 74, each of the turning arms thus being disposed above the turning shaft 72 and being adapted to turn therewith about its axis. A transfer slide, generally designated by the numeral 76, is disposed beneath each of the turning arms 70 and is arranged generally parallel thereto and is adapted to move longitudinally from a position beneath the turning arms 70 to a position disposed outwardly therefrom and to the right as viewed in FIGS. 6-9. The rear end or left-hand end of the transfer slide 76 as viewed in FIGS. 6-9 is provided with an upstanding arm 78 which is connected to an associated turning arm 70 by means of a link 80. More specifically, one end of the link 80 is provided with a right angle arm 82 which is pivotally interconnected with the upper end of the arm 78 as at 84, and the link 80 is pivotally connected at the other end thereof, as at 86, to a bracket 88 which is attached to the associated turning arm 70 intermediate the ends thereof.

Each of the turning arms 70 is further provided with a pair of locking fingers, one of the locking fingers being designated by the numeral 90 and being disposed adjacent to the mat turning shaft 72 and the other locking finger 92 being disposed adjacent to the other end of the turning arm 70. As will be described more fully hereinafter, the locking fingers 90 and 92 are adapted selectively to grip a mat disposed upon the turning arm 70 so as to clamp the mat thereto whereby to turn the mat upon pivoting of the turning arm 70 about the axis of the mat turning shaft 72 in a clockwise direction as seen in FIGS. 10 to 13. In their alternate positions the fingers permit the mat 30 to slide from the arms 70 and onto the associated transfer slide 76 when the arms 70 are raised. The outer or right-hand end of the transfer slide 76 is provided adjacent to the outer end thereof with a retainer 93 which can be selectively moved between an upstanding retaining position as illustrated in FIG. 6 and a down or non-retaining position as illustrated in FIG. 9. Associated with the transfer slide 76 there is a transfer finger 94 mounted on the end of a piston rod of a transfer cylinder 96, the cylinder 96 being pivotal in a vertical plane beside the associated transfer slide 76, as will be explained more fully hereinafter. At the beginning of a transfer cycle, as viewed in FIG. 6, the transfer finger 94 is disposed upwardly and adjacent the edge of a mat on the turning arm 70 whereby immediately to receive the edge of the mat as the turning arm 70 begins to pivot in a mat transferring operation. Thereafter the cylinder 96 is pivoted and the finger 93 is extended promptly to receive the edge of the mat on the transfer slide 76 and in position against the retainer finger 93. The relationship between the pivoting of the cylinder 96 and the outward movement of the transfer finger 94 is diagrammatically illustrated in FIG. 9A of the drawings from which it will be seen that the transfer finger 94 deposits the mat upon the transfer slide 76 while the slide is only partially extended.

Referring now particularly to FIG. 6 of the drawings, the parts of the turning and transferring mechanism 60 have been illustrated in the position occupied by them at the time a newly formed mat 30 is received thereon from the mat accelerating mechanism 56 of the machine. With further reference to FIGS. 7-9, the manner in which a mat 30 is transferred without turning will now be described. After the mat 30 has been positioned as illustrated schematically in FIG. 6, the turning shaft 72 begins to rotate to pivot the turning arms 70 in a clockwise direction toward the position illustrated in FIG. 7 of the drawings. Substantially simultaneously with the initial movement of the arms 70 the mat 30 is engaged by the transfer finger 94, the transfer finger 94 engaging the line wire disposed toward the stacking area, this line wire being hereafter referred to as the control line wire and being designated by the numeral 100. The transfer finger 94 is then carried in a clockwise direction by the pivoting and extending cylinder 96 and the finger quickly deposits the mat 30 on the transfer slides 76 and in position against the retainer 93 thereon at approximately the point illustrated in FIG. 7. The retainer 93 then assumes control of the mat 30 and as the transfer slides 76 continue moving outwardly the turning arms 70 continue to pivot in a clockwise direction toward the position illustrated by solid lines in FIG. 8 and then to the position illustrated by the broken lines, the mat 30 is dropped completely onto the transfer slides 76. When the transfer slides 76 approach their outermost position, the retainer 93 is pivoted to the horizontal or non-retaining position thereafter to permit the transfer slides 76 to be retracted or returned to the left, as viewed in FIG. 9, thereby depositing the mat 30 upon a stack in the stacking area. It will be seen that the mat 30 will thereupon have been transferred laterally and deposited upon the stack of mats without any turning or reversing of the mat. The parts, including the turning arms 70 and the transfer slides 76, continue their return movement toward the position illustrated in FIG. 6 and finally arrive at that terminal position which is also illustrated in FIG. 10 of the drawings, the cylinder 96 being also retracted and returned to its initial position.

Referring now to FIGS. 10 to 13 of the drawings, an explanation will be given of the manner in which the mechanism can turn or reverse a mat 30 utilizing the same basic movement of the major parts of the machine. The turning arms 70 when in the position illustrated in FIG. 10 receive the next mat 30 with the line wires 32 disposed thereagainst and arranged at right angles with respect thereto and with the cross wires 34 arranged generally parallel to the turning arms 70. The locking fingers 90 and 92, which are retracted during the mat transfer operation illustrated in FIGS. 6–9, are now rotated to the mat engaging position so as to grip the outermost line wires including the control line wire 100. The transfer finger 94 remains inactive and is carried downwardly by the pivoting cylinder 96 from the position illustrated in FIG. 10 to that shown in FIG. 11 but is not extended with respect to the cylinder 96 and, accordingly, arrives in the position illustrated in FIG. 11 without interfering with the mat. The mat 30 is firmly held or retained upon the turning arms 70 by the locking fingers 90 and 92 and the turning arms carried by the shaft 72 are pivoted in a clockwise direction toward the position illustrated by solid lines in FIG. 12 and finally to the position illustrated by the broken lines in FIG. 13, the mat 30 thereupon being disposed horizontally beneath the horizontally extending turning arms 70 with the cross wires 34 disposed beneath the line wires 32 of the mat. The mat 30 at this time rests upon the extended transfer slides 76 but can easily slide therefrom as the transfer slides 76 are later retracted to the left, the retainer 93 being in the down or non-retaining position. The locking fingers 90—92 are released which permits the turning arm 70 to be lifted and pivoted free of the mat in a returning counterclockwise direction from the horizontal position illustrated by broken lines in FIG. 13 and back to the horizontal mat receiving position illustrated in FIGS. 6 and 10 of the drawings, the slides 76 being simultaneously withdrawn from beneath the mat to the left toward the retracted position to deposit the mat upon the stack.

From the foregoing it will be seen that the same basic cycle and motions of the turning arms 70, the transfer slides 76 and the connecting links 80 are utilized in both the mat transferring motion of FIGS. 6–9 and the mat turning or reversing motion of FIGS. 10–13. The differences in operation are obtained entirely by controlling the transfer finger 94 and the locking fingers 90 and 92. Automatic control means are provided, as will be explained more fully hereinafter, to actuate these members in a predetermined desired manner to effect either mat transferring or mat turning.

The general construction of a commercial machine embodying the elements illustrated diagrammatically in FIGS. 6–13 will now be described, reference first being made particularly to FIGS. 14–16 of the drawings wherein the various major portions of the mat stacking mechanism 50 have the same numerals applied thereto as in FIG. 5, these major portions including the accelerating mechanism 56, the turning and transferring mechanism 60, the stacking area 62 and the shipping area 66. The shear 54 of the associated mat fabricating machine 52 is also diagrammatically illustrated in FIG. 14, the outlet thereof being defined by a pair of parallel guide plates 102. The accelerating mechanism 56 has the input end thereof disposed between the plates 102 and includes a suitable frame having longitudinal frame members 104, transverse frame members 106 and vertical frame members 108 (FIG. 15). A plurality of acceleration rollers 110 are provided on the frame, six of the rollers 110 being illustrated in the accelerating assembly. Each of the rollers 110 is cylindrical throughout the major portion of the length thereof and each includes a support shaft 112 mounted at its opposite ends in suitable bearings 114 provided on the longitudinal frame members 104. One end of each of the shafts 112 is provided with suitable sprockets to accommodate drive chains 116 interconnecting adjacent rollers 110. All of the rollers are simultaneously driven through the medium of the drive chains 116 by a pair of drive chains 118 which are connected to the output of a gear reducer unit 120 that is driven by an accelerating roller drive electric motor 122 which may be of the usual 440 volt, 3 phase, 60 cycle type. It will be seen that the axes of the rollers 110 are generally disposed horizontally but are angularly located with respect to the direction of movement of a mat which is indicated by the arrow 124 (FIG. 14). As a result of this angular disposition of the rollers 110, the mats are fed longitudinally to the left in the direction of the arrow 124 and also rearwardly (as seen in FIG. 14) or transversely to the direction of the arrow 124, this movement facilitating control of the mats and minimizing the control structure required.

Full control of the path of movement of the mats from the shear 54 along the accelerating section 56 of the machine is accomplished by the combination of the angular disposition of the rollers 110 and a plurality of freely rotatable alignment control idler wheels that are generally designated by the numeral 130. Four of the alignment control wheels 130 have been shown on the accelerating mechanism 56, the wheels being disposed between adjacent acceleration rollers 110. Each of the wheels 130 includes a flat circular plate 132 which is rotatably mounted upon one of the longitudinal frame members 104, with the plane of the plate being inclined at an angle of approximately 20° with respect to the horizontal. Each plate 130 has disposed around the periphery thereof a plurality of lugs 134, the lugs 134 being spaced apart a distance greater than the diameter or thickness of the cross wires 34 of the mat. Preferably, the lugs 134 are in the form of cylindrical rods which have the axes thereof inclined with respect to the plane of the plate 132 and, more particularly, are disposed at an angle of about 110° with respect thereto so that the lugs 134 at the high point of each wheel extend approximately in the vertical direction to be engaged by and to control the position and alignment of the control line wire 100. In this manner the horizontal path followed by a mat upon the accelerating section 56 of the machine is effectively controlled by the combination of the angular disposition of the accelerating rollers 110 and the alignment wheels 130. As the mat is fed across the rollers 110 the cross wires of the mat or the ends 40 thereof engage between the lugs 134 whereby to rotate the wheels 130, but the lugs easily and quickly disengage the cross wires and as the wheels rotate, new lugs 134 engage subsequent cross wires, thereby giving a continuous controlled path for the mat along the accelerating mechanism 56.

In order to insure that the overhang 38 on the leading ends of the line wires of a mat fed along the accelerating mechanism do not become entangled therein, a plurality of deflectors are provided between the rollers 110 and between the rollers 110 and the transverse frame members 106. The construction of these deflectors may be best seen in FIG. 24 where a vertical section is taken through a portion of the accelerating mechanism 56. One form of deflector is provided between a pair of the accelerating rollers 110 when no transverse frame member 106 is disposed therebetween, this form of deflector being designated by the numeral 136 and having a general outline in the nature of a parallelogram. The edge of the deflector 136 disposed toward the shear 54 is positioned below the adjacent roller 110 and the deflector gradually slopes upwardly and to the left, as viewed in FIG. 24, and terminates in a generally horizontal flange 138 which is in general alignment with the top of the next roller 110 to direct the overhanging forward ends of the line wires upwardly and over the last mentioned roller. Another form of deflector 140 is provided between each accelerating roller 110 and an adjacent transverse frame member 106 when the frame member 106 is located in the direction of feed with respect to the roller, this form of deflector being triangular and sloping upwardly to the left (as viewed in FIG. 24) and terminating in a flange 142 disposed toward and in general alignment with the top of the frame member 106. The next succeeding deflector 144 is also triangular in form and terminates to the left in a flange 146 having the top surface thereof in general alignment with the top surface of the next roller 110. The deflectors may be secured to the frame members in any suitable way, and from the above description it will be seen that the overhanging ends of the line wires 32 of the mats will easily be deflected upwardly and over the rollers 110 and over the transverse frame members 106 whereby to prevent entanglement therewith.

The mat turning and transfer mechanism 60 which follows the accelerating mechanism includes a plurality of substantially identical turn-transfer units generally designated by the numeral 150, each individual unit in FIG. 14 being given a further identifying letter suffix beginning with the letter A and applying the next letter proceeding to the left. Four of the turn-transfer units 150 have been illustrated and, accordingly, these units have been designated with the letters A through D. Since all of the turn-transfer units 150 are substantially identical in construction, the same identifying numerals will be applied to the individual parts thereof where appropriate.

Referring now to FIGS. 14 to 21, the details of construction of one of the turn-transfer units 150 will be described in detail. The unit 150 includes a plurality of vertical frame members 152 which are longitudinally interconnected by frame members 154 and are interconnected laterally (in the direction of initial movement of the mat) by transverse frame members 156. Mounted on the frame members are positioning rollers 158 which like the accelerating rollers 110, are suitably supported upon shafts 160 mounted in bearings 162. The rollers 158 are mounted with the axes thereof substantially parallel to the axes of the rollers 110 and therefore at an angle with respect to the path of the associated mats whereby to direct and urge the mats fed therealong to one side or toward the top of the figure as viewed in FIG. 14 as well as therealong to the left. The positioning rollers 158 are powered from a motor 164 and the output shaft thereof is connected to a gear reducer unit 166 which drives a plurality of interconnected sprocket and chain connections 168 so as to drive all of the positioning rollers 158 in unison.

Lateral control of the mats upon the turn-transfer units 150 is achieved by means of idler positioning wheels 170 that are similar in construction to the positioning wheels 130 described above, one of the positioning wheels 170 being provided between each adjacent pair of turn-transfer units 150. Referring to FIGS. 22 and 23, it will be seen that each of the positioning wheels 170 includes a substantially flat circular plate 172 that is rotatably mounted upon a lever 174 which is in turn pivoted, as at 176, upon a vertical frame member 178. In the operative or guiding position that is illustrated by the solid lines in FIG. 18, the plate 172 is disposed at an angle of approximately 20° with respect to the horizontal and with the upper edge thereof slightly below a mat 30 being guided thereby and supported on the rollers 158. Extending upwardly and outwardly from the periphery of the plate 172 there are a plurality of lugs 180 which may be in the form of stub rods having the axes thereof inclined outwardly with respect to the plate 172 at an angle of approximately 110° so that the uppermost lug at the top of the plate at any particular instant is positioned substantially vertically at the point at which it is adapted to engage or be engaged by the line wire 100 of a contacting mat. As the mat moves past the alignment control wheel 170, the ends 40 of the cross wires 34 overhang the control line wire 100 and extend past the uppermost lug 180, thus permitting the control line wire 100 to engage the uppermost lug 180. The control wheel 170 therefore serves to position the mat 30 laterally in cooperation with the angular drive force imparted to the mats by the accelerating rollers 110 and the positioning rollers 158. As the mat 30 moves past the alignment control wheel 170, successive cross wires 34 and particularly the overhanging ends 40 thereof engage the uppermost lugs 180 whereby to turn the control wheel 170 and continuously to present lugs 180 in controlling relationship with respect to the control line wire 100. The lever 174 extends rearwardly as viewed in FIG. 22 past the pivot point 176 and carries thereon a transverse control rod 182 (FIGS. 14 and 22) which extends between adjacent turn-transfer units 150 and is adapted to engage the underside of the adjacent turning arms 70 thereof. Accordingly, when the turning arms 70 are in the down or mat receiving position, each alignment control wheel 170 is in the upper or controlling position as illustrated by the solid lines in FIG. 22. Lifting of the turning arms 70 permits the lever 174 to pivot in a clockwise direction, as viewed in FIG. 22, this position being illustrated in broken lines therein in which position the lugs 180 no longer contact the control line wire 100 and thereby permit movement of the mat 30 over and past the lowered alignment control wheels 170. Suitable stops (not shown) are provided for limiting the downward pivotation of the lever 174.

Each of the individual turn-transfer units 150 includes a pair of the turning arms 70 which may be in the form of light-weight I-beams, the turning arms in each unit 150 being disposed parallel to each other. One end of each of the arms is provided with a pair of the brackets 74, one bracket being disposed on one side of the I-beam forming the arm 70 and the other bracket being disposed on the other side thereof. The brackets 74 are in turn fixed to a hub attached to the turning shaft 72 of the turn-transfer unit, the turning shaft 72 being mounted in and extending from an associated unit gear box 184. More particularly, the gear box 184 is disposed between the pair of turning arms 70 of the turn-transfer unit 150 and the shaft 72 extends out of each side of the gear box fixedly to engage the brackets 74 which in turn connect the turning arms 70 to the shaft 72. The gear box 184 includes gear reduction mechanism of any suitable kind and is powered from a main line shaft 186 that is driven from a main gear box 188 powered by a main drive motor 190 that is preferably of the D.C. type. More specifically, the output shaft of the motor 190 is preferably connected through a flexible coupling 192 (FIG. 14) and a solenoid brake 194 to the input shaft of the main gear box 188. The main gear box 188, through the main drive shaft 186, drives the four substantially identical unit gear boxes 184 which respectively power the individual turn-transfer units 150. By means of this power connection the turning arms 70 are moved from a lower substantially horizontal position illustrated by the solid lines in FIG. 16, through the position illustrated by the broken lines therein, and to the substantially horizontal position extending laterally and outwardly to the right with respect to the turning shaft 72, as is illustrated in FIG. 17.

Each of the turn-transfer units 150 also includes a pair of the transfer slides 76 which may be formed as light-weight I-beams and are disposed upon rollers 196 that are rotatably mounted between parallel longitudinal frame members 154. More specifically, the two transfer slides 76 rest upon a plurality of the spaced rollers 196 and also on two pairs of rollers 198 mounted respectively on frames 200 that are located along the opposite sides of the gear box 184 (see FIGS. 16 and 21). Each frame 200 also carries an upper roller 202 which engages the top of the associated transfer slide 76 and is spaced inwardly with respect to the outermost roller 198 so that the transfer slide 76 is supported in cantilever fashion when it has been extended to the position viewed in FIG. 17. The outer ends of the transfer slide 76 (disposed to the right as viewed in FIG. 16) are interconnected by a transfer stripper roller 204 (see also FIGS. 17 and 20A) which facilitates withdrawal of the transfer slides 76 from beneath a mat 30 at the end of a stacking operation and when the parts are about to be returned to their terminal positions preparatory to receipt of another mat 30.

A transfer cylinder 96, which has been described heretofore, is provided for each of the turn-transfer units 150 and is mounted upon one of the frame members 154 for pivotal movement in a vertical plane. The cylinder is mounted in a position such that the transfer finger 94 on the outer end of its piston rod is disposed inwardly with respect to the right-hand edge of the machine, as viewed in FIG. 16, when the piston rod is retracted. Means are provided to pivot and to control the movement of the cylinder 96 in accordance with the movement of the associated transfer slides 76. This means is in the form of an interconnecting control linkage which includes a bracket 206 that is fixed to the cylinder 96 below the pivot point thereof, as viewed in FIG. 16. The lower end of the bracket 206 is connected by an elongated link 208 to the lower end of a lever arm 210 which is pivoted intermediate its ends to the frame members 154. The other end of the lever 210 is Y-shaped or forked to provide a pair of arms 212 and 214 defining therebetween a slot in which is adapted to be received a control pin 216 mounted on the vertical arm 78 of the adjacent transfer slide 76. As has been explained above, rotation of the turning arms 70 in a clockwise direction, as viewed in FIG. 16, causes the slides 76 to be shifted to the right due to the action of the linkage 80, 82, 78. During the initial part of this movement of the slides 76, the control pin 216 mounted on one of the slides 76 engages the arm 214 on the lever 210 whereby to pivot that lever from the position shown in solid lines in FIG. 16 to the position shown in broken lines therein. Such movement of the parts pivots the transfer cylinder 96 in a clockwise direction until the axis thereof is disposed substantially horizontally, as seen in FIG. 17. The outer end of the arm 214 is rounded to permit the control pin 216 to disengage with respect to the lever arm 210 as the transfer slides 76 continue their outward movement. Inward or retracting movement of the transfer slides 76 eventually will bring the control pin 216 to a point such that it will again engage between the arms 212—214 and will bear against the arm 212 whereby to return the parts from the position illustrated in FIG. 17 to that illustrated in solid lines in FIG. 16.

Deflectors are provided in the turn-transfer units 150 between the positioning rollers 158 and the associated frame members 154 for the same reasons that the deflectors 136, 140 and 144 are provided in the accelerating mechanism 56. Each of the deflectors in the turning and transferring mechanism 60 is triangular in shape and formed substantially like the deflectors 140 and 144 discussed above. If desired, the last turn-transfer unit 150D may be provided with an additional roller 218 (see FIGS. 14 and 28) mounted on a frame 219 and having an axle 220 mounted in bearings 221 on the frame 219. The axis of the roller 218 is disposed parallel to the turning arms 70 and therefore parallel to the cross wires 34 and perpendicular to the line wires 32.

Control of the longitudinal position of the mat 30 along the turning and transferring mechanism 60 is accomplished by a mat control stop assembly which is generally designated by the numeral 222 and is best seen in FIGS. 14, and 28–30 of the drawings. The stop assembly 222 may be mounted upon any desired pair of the turning arms 70 of a turn-transfer unit 150 but has been specifically illustrated as being disposed on the turning arms 70 of the last turn-transfer unit 150D. The assembly 222 includes a base plate 224 which rests upon and extends between the associated pair of turning arms 70 and may be adjustably fixed thereto at any place along the length thereof by any suitable means, such as by adjustable clamp plates 226 that may be secured by bolts to the opposite ends of the plate 224 and which may have lips that embrace and grip the flanges of the upper sides of the I-beam sections of the arms 70. A plurality of longitudinal slots 228 are provided in the plate 224 adjacent to one end thereof and the slots receive therethrough bolts which serve to mount an adjustable bracket 230 on the plate 224. More specifically, a plurality of bolts 232 extend through apertures in the bracket 230 and through the slots 228 whereby to position the bracket 230 at any desired point within the length of the slots 228. The bracket 230 carries a pair of forwardly extending embossments 234 which slidably receive therethrough a pair of plunger-like shafts 236. One end of each of the shafts 236 has a depending finger 238 formed thereon and the other end of each shaft 236 carries an enlarged head in the form of a nut 240 engaging one side of the bracket 230 so as to retain the shaft 236 in operative relationship thereto. A coil spring 242 is disposed about each shaft between the finger 238 thereof and the adjacent embossment 234 to urge the shaft and the attached finger 238 outwardly toward the approaching mats 30. Each nut 240 is adapted to engage a plate 244 which is welded or otherwise secured to the upper ends of a pair of spaced-apart upstanding arms 245 that are respectively pivotally mounted between pairs of ears formed on the bracket 230, the arms being pivotal about an axis 246 (see FIGS. 29 and 30). Plunger-like movement of either of the shafts 236 against the compressive force of its encompassing spring 242 will cause the nut 240 on that shaft to bear against and pivot the plate 244 rearwardly about the axis 246, thereby causing the plate to move an upstanding actuating arm 248 of a microswitch 250 that is mounted on the bracket 230. This movement of the actuating arm, the upper end of which may be provided with a roller bearing on the back of the plate 244, will operate the switch 250. Thus, it will be understood that a mat being fed by the rollers 158 toward the left, as viewed in FIG. 14, will have its leading cross wire 34 brought against the depending fingers 238 with the leading ends or overhang 38 of the line wires 32 of the mat straddling each of the fingers and extending past the same but terminating short of the bracket 230. The force with which the leading cross wire of the mat strikes the fingers 238 will cause the plungers or shafts 236 to be moved against the force of the coil springs 242, the fingers, plungers and springs thus serving as a shock absorbing stop assembly for stopping the longitudinal movement of the mat. At the same time, however, the shock absorbing depression of the plungers or shafts 236 will pivot the plate 244 and cause the microswitch 250 to be operated. As will be explained more fully hereinafter, operation of the switch 250 stops the motor 164 and thus stops the rollers 158 driven thereby, whereupon the mat will be ready for the transfer operation.

In adjusting the position of the base plate 224 of the mat control stop assembly on a pair of turning arms 70, the plate is located on the arms so that none of the line wires 32 of the mats oriented by the control wheels 170 will be in alignment with the plungers or shafts 236 of the stop assembly. Thus, neither the fingers 238 nor the plungers 236 or any other part of the stop assembly will interfere with the mat when it is to be turned over during the subsequent transfer operation, as described above with respect to FIGS. 10 to 13. In a transfer operation, however, wherein the mat is to be slid laterally along the turning arms 70, as explained above with respect to FIGS. 6 to 9, it is necessary that the fingers 238 of the stop assembly pivot out of the way of the line wires so as to permit the line wires to pass therebeneath. Such pivotal movement of the fingers may be accomplished in the present structure by rotation of the shafts 236 in the embossments 234. As an alternate, the fingers themselves may be pivotally mounted in any suitable way on the forward ends of the shafts 236. Such an alternate is shown in FIG. 30 where the fingers are shown secured to collars which are rotatably received on reduced forward end portions of the shafts 236, thus permitting the fingers easily and freely to be pivoted to the broken line positions shown in FIG. 30 so as to clear the line wires of a mat 30 when the mat is slid laterally along the turning arms 70.

The details of construction of the locking fingers 90 and 92, which are provided on each of the turning arms 70, can be best seen by reference to FIGS. 26 and 27 of the drawings. A first hydraulic motor 252 of the expansion-contraction type is mounted upon each turning arm 70 adjacent the brackets 74 thereof and is pivoted to the arm 70 at a point 254 which is fixed with respect to the turning arm 70. The motor 252 is provided with the usual piston (not shown) and has a piston rod 256 extending therefrom which carries a connector 258. The connector 258 is pivotally attached to the locking finger 90 which is, in turn, pivotally mounted on the bracket 74, as at 260. Expansion of the motor 252 serves to move the parts to the position illustrated in FIG. 27 whereby the locking finger 90 is retracted from contact with the control line wire 100 of a mat 30, whereas contraction of the motor 252 pivots the locking finger 90 in a counterclockwise direction and into locking connection with the control line wire 100 as seen in FIG. 26. The locking finger 92 is adapted to be adjustable along the turning arm 70 and to this end it is mounted upon a slide bracket 262 slidably mounted upon the arm 70. A threaded shaft 264 is connected to the bracket 262 and engages a nut 266 positioned between a pair of retainer plates 268 fixed upon the arm 70. A detachable crank 270 may be used to engage the shaft 264 at the outer end thereof to shift the bracket 262 along the arm 70 to adjust the operating position of the locking finger 92. A hydraulic motor 272, again of the expansion-contraction type, is pivotally mounted on the bracket 262 at 274. The motor 272 in addition to the usual cylinder is provided with a piston and hydraulic connections (not shown). A piston rod 276 extends from the motor 272 and carries thereon a connector 278 that is pivotally connected to the locking finger 92 which, in turn, is pivotally mounted upon the bracket 262 at 280. Expansion of the motor 272 moves the locking finger 92 to the non-engaging counterclockwise position illustrated in FIG. 27, and contraction of the motor 272 serves to pivot the locking finger 92 in a clockwise direction and into locking engagement with an associated line wire 32 of a mat 30.

The details of construction of the retainers 93 will now be described with special reference to FIGS. 18, 19, 31 and 32 of the drawings, it being understood that there is a retainer 93 at the outer end of each transfer slide 76. Each of the transfer slides adjacent the outer end thereof has the upper flange of the I-beam removed on one side and one end of a retainer member 93 is pivoted on the web of the I-beam in any suitable fashion at 282 (FIG. 31) so that the member 93 may be pivoted between an upright and a substantially horizontal position. The free end of the retainer 93 has a forwardly extending short arm or lug 284 formed thereon to which there is pivotally connected one end of an operating link 286 for the retainer, the other end of the link being pivotally connected to the forward end of a longitudinally extending control rod 288 which is disposed alongside the web of the I-beam section of the transfer slide 76. A longitudinally extending slot 290 is provided in the web of the I-beam section adjacent the outer end of the transfer slide and serves as a guide for that end of the link 286 to which the outer end of the control rod 288 is attached. Any suitable structural relationship between the guide slot 290 and the guided end of the link 286 may be employed. For example, the forward end of the control rod 288 may be T-shaped, with one side of the T pivotally received in the end of the link 286 and the other side of the T slidably received in the slot 290, as indicated in FIG. 32. When this arrangement is used, the extremity of the side of the T which slides in the slot may be provided with a suitable enlarged head 289 for the purpose of preventing that side of the T from being displaced laterally from the slot (FIG. 32).

The rear end of each control rod 288 is provided with a transversely extending control member or hook 292 which is arranged to travel between and alternately to engage a pair of stationary stops 294 and 296 which are spaced-apart a distance only slightly less than the length of travel of the slide 76. The forward stop 294, for example, may be suitably mounted upon the rear side of the frame 200 (FIG. 18) which stands along the side of the gear box 184 (FIG. 21) and which carries the rollers 198 and 202 that support the slide 76 in cantilever fashion when the slide is extended. The rear stop 296, on the other hand, may be fixed in any suitable fashion upon the support member 154 adjacent its rear end and alongside the path of travel of the inner end of the slide 76 (FIGS. 18 and 19). The forward stop 294 is preferably located so that the control member or hook 292 on the control rod 288 will engage the forward stop 294 just before the slide 76 reaches the outer limits of its travel and when, for example, the turn arms 70 are only about 5 degrees short of reaching the limit of their outwardly pivoting motion (see broken lines in FIG. 9). The rear stop 296, on the other hand, is preferably located so that the control member or hook 292 on the control rod 288 will engage the stop during the retraction of the slide 76 just before the slide reaches its terminal position and when, for example, the turning arms 70 are only about 5 degrees short of reaching their terminal horizontal and mat receiving positions (FIGS. 6 and 10) on their return stroke. Thus, when the slide 76 leaves its terminal position and begins its extending movement as the turn arms begin to rotate, the retainer 93 will be in its "up" position (FIGS. 6, 7, 10, 11 and 31) and will remain in this "up" position until shortly before the slide reaches the outer limits of its travel when the control member or hook on the control rod 288 will engage the forward stop 294. Engagement of this stop 294 will prevent the control rod from being carried further along with the slide, with the result that the subsequent relative motion between the slide and control rod will pivot the retainer 93 and its control link 286 to their retracted position shown in broken lines in FIG. 31. If a mat sliding transfer operation, such as shown in FIGS. 6 to 9 (where the mat is not turned over), has been in progress, the retraction of the retainer 93 causes the retainer to be pulled downwardly under the control line wire 100 of the mat, the sloping rear edge of the control link 286 in effect lifting the line wire to permit the retraction. Thereafter, the slide 76 begins its retracting motion during which the retainer 93 will be in its retracted position so as to clear the line wires of the mat from beneath which the slide 76 is being pulled. Just before the slide reaches its fully retracted or terminal position (at which time the slide will have cleared the mat), the control member or hook 292 on the rear of the control rod 288 will engage the rear stop 296, thereby causing the retainer 93 to be pivoted upwardly to its raised or "reset" position preparatory to the next extending movement of the slide 76, during which the retainer 93 will serve to orient and control the position of the control line wire 100 of the next mat if that mat is to be transferred by laterally sliding the same (FIGS. 6 to 9) rather than by lifting and turning the same over (FIGS. 10 to 13).

In order to insure that a mat positioned upon the transfer slide 76 at the completion of either a transfer or a turn cycle will remain in the desired deposited position and not be lifted upon as the transfer slides 76 are retracted, means is provided to control the rear edge of the mats during the retraction of the transfer slides 76. To this end a plurality of transfer slide strippers 300 are provided, see particularly FIGS. 18, 19, and 21, the strippers being in the form of a plurality of identical plates each mounted on and attached to the frame members 200 and including a vertical portion 302 and a rearwardly curved upper portion 304. The vertical portion 302 is provided with a plurality of teeth 306 which have the lower edges thereof disposed substantially horizontally and of a size such as to engage and to hold the adjacent edge line wire of a mat positioned upon the stacking area or upon the conveyor 64. The engagement between the teeth 306 and the mats prevents movement of the rear edges of the mats upwardly as the transfer slides 76 are retracted.

An air control system for controlling and actuating the transfer cylinders 96 and the locking finger actuating motors 252 and 272 will now be described with particular reference to FIG. 36 of the drawings. Each of the turn-transfer units 150 is provided with one transfer cylinder 96, with two locking finger fluid motors 252 which control the pair of locking fingers 90 on each pair of the turning arms 70 and a pair of fluid motors 272 which control the other pair of locking fingers 92 on the turning arms 70. Accordingly, these numbers have been applied to the various parts in FIG. 36 with the suitable letter suffixes to designate which turn-transfer unit is controlled thereby. A main air supply line 310 is connected to a source (not shown) of air under pressure and supplies the air through a supply shut-off valve 312, a water separator 314 and an air lubricator 316 to a main air supply header 318 from which all of the fluid motors and controls therefor are supplied with air under pressure.

All four of the transfer cylinders 96 are supplied from the header 318 by a line 320 having a shut-off valve 322 therein. The line 320 communicates with two air-controlled four-way solenoid valves 324 of standard and well-known construction, the valve 324 disposed to the right in FIG. 36 controlling the transfer cylinders 96A and 96B and the solenoid valve 324 to the left controlling the transfer cylinders 96C and 96D. Each of the valves 324 is further provided with connections 326 leading to the lower ends of the cylinders 96, as viewed in FIG. 36, and with connections 328 leading to the upper ends thereof through speed control valves 330. The usual exhaust line 332 is also provided for each of the solenoid control valves 324. The retracted position of the pistons of the transfer cylinders 96 is obtained when the solenoid valves 324 are under the control of a return spring therein whereby to admit air under pressure to the lines 328 and to exhaust through lines 326 and 332 through the valve 324. The extended or transferring movement of the cylinders 96 is obtained by energizing the solenoid valves 324 whereby to admit air under pressure through the lines 326 and to connect the lines 328 to the exhaust 332 whereby to vent the lines 328 under the control of the speed control valves 330. This gives a speed-controlled outward movement in a well-understood way to the pistons carrying the transfer fingers 94. Subsequent de-energization of the solenoid valves 324 permits the springs therein to return the parts to a position such that the lines 326 are connected to the exhaust 332 and air under pressure is admitted through the lines 328 to return the parts to the retracted position.

The operation of the fluid motors 252 and 272 in each of the turn-transfer units 150 is controlled by a solenoid valve 340 similar in construction and operation to the solenoid valves 324 discussed above. Each of the solenoid valves 340 is connected to the header 318 through a line 342 having a control valve 344 therein. One of the connections from the solenoid valve 340 is made through a line 346 to the inner or rear ends of the motors 252 and 272 on the associated turning arms 70, the line 346 also including a speed control valve 348. Another connection from the solenoid valve 340 is made through a line 350 to the outer or head ends of the motors 252 and 272, the line 350 also carrying a speed control valve 352. The usual exhaust connection 354 is also provided for the solenoid valve 340.

All four of the fluid motors 252 and 272 on a turn-transfer unit 150 may be held in the retracted or non-transfer position by de-energizing the associated solenoid valve 340 whereby to permit the spring therein to return the parts to position such that air under pressure is admitted to the line 350, and the line 346 is connected to the exhaust 354. If it is desired to actuate the locking fingers 90 and 92 so that they grasp a mat positioned on the turning arms 70, the solenoid valve 340 is energized to shift the valve thereof to a position such that air under pressure is admitted to the lines 346, and line 350 is connected to the exhaust 354. Movement of the fingers toward the locking position is thus under the control of the speed control valve 352 so that a steady but firm engagement of the fingers 90 and 92 with the associated mat is obtained. When it is desired to release the fingers 90 and 92, the solenoid valve 340 is de-energized and the spring therein returns the parts of the valve to positions such that air under pressure is connected to the line 350, and the line 346 is vented to the atmosphere through the speed control valve 348 whereby to control the rate of movement of the locking fingers 90 and 92 from the locking to the non-locking position.

In order further to understand the relationship between the turning arms 70 and the transfer slides 76 and their interconnecting parts, reference is made to FIG. 25 wherein a plurality of progressive positions of the parts have been illustrated and designated by corresponding arabic numerals. The mat receiving or "Reset Position" is shown to the left as the zero degree position. The first position above the reset position is shown to be that position assumed when the turning arms 70 have been pivoted 15° in a clockwise direction. It will be seen that the transfer slides 76 have been moved only a short distance to the left from the zero position to the "1" position at this time. Another 15° rotation of the turning arms 70 in a clockwise direction moves the transfer slides 76 a farther distance to the right than did the first 15° of rotation; thereafter, increasing increments of movement of the transfer slides 76 are obtained for each 15° movement of the turning arms 70, so that when the turning arms 70 are in a vertical position or "position 6," the transfer slides 76 have moved a substantial portion of their total length of travel to the right. Further rotation of the transfer arms 70 in a clockwise direction produces a decrease in the increments of movement of the transfer slides 76, whereby the transfer slides 76 will be seen to have moved quickly into a position to receive a mat thereon from the turning arms 70. This is particularly desirable when transferring a mat by the lateral sliding operation shown in FIGS. 6 to 9 so that substantially all of the transfer of the mat from the turning arms 70 onto the transfer slides 76 occurs during the first 90° of rotation of the turning arms 70 and there is no opportunity for the mat to be fouled by the rotating movement of the arms.

The position assumed by the parts at the end of a half cycle of operation is designated in FIG. 25 as position "12," in which position the turning arms 70 are disposed substantially horizontally and the transfer slides 76 are at their outermost right-hand position, as viewed in FIG. 25, this being called the "Half Cycle Position." Next, the transfer arms 70 are rotated in a counterclockwise direction 180°, retracting the positions indicated but in inverse order whereby to return the parts to the zero degree position or the "Reset Position" wherein the turning arms 70 are again disposed horizontally and to the left and wherein the transfer slides 76 have been retracted to the full extent and to the left in FIG. 25.

The A.C. or alternating current electrical control system employed to obtain the desired operation of the machine has been diagrammatically illustrated in FIG. 37 of the drawings. All of the A.C. electrical power for operation may be obtained from a suitable source 400 which may be a 440 volt, 3 phase, 60 cycle A.C. source provided with a control switch 402 and suitable fuses 404 for supplying electrical energy to lines 401, 403 and 405. As has been explained above, the acceleration roller drive motor 122 is preferably a 440 volt, 3 phase motor and this motor is connected to the lines through suitable fuses and a motor starter 461 which is controlled by a solenoid 460 to be described more fully hereinafter. The positioning motor 164 is preferably also a 440 volt, 3 phase motor which is connected through suitable fuses and a motor starter 471 that is controlled by a relay 470 to be described more fully hereinafter.

The primary winding 511 of a transformer 510 is connected across the lines 401 and 403 whereby to provide on the secondary winding 512 thereof a 110 volt control voltage. One end of the winding 512 is connected through a line 515 to ground and the other end is connected through a line 513 to a main control switch 514 which, is in turn, connected through a fuse 516 to the main 110 volt control line 520.

The control for the acceleration roller motor 122 and the positioning roller motor 164 consists of a pair of relays 460 and 470, respectively. Electrical connections for these relays is obtained from the main line 520 through a "Feed Rolls" switch 522 that is adapted to provide automatic operation when in the closed position as illustrated in the drawings and which can be also placed in a manual position that corresponds to the open position shown by the broken line in FIG. 37. The switch 522 is connected to a line 524 which in turn connects with two pairs of parallel switch contacts 462 and 526. The switch contacts 462 are directly controlled by the relay 460 and are normally in the open position as illustrated. The switch contacts 526 are located in the shear control panel 58 which has been described heretofore and are automatically closed when a newly formed mat is sheared or cut from the line wires from which the mat is formed. The lower one of the switch contacts 462 is connected by a line 530 through a first pair of normally closed contacts 504 controlled by a relay 500 and through a line 493 to a second pair of normally closed contacts 492 controlled by a relay 490. A line 472 connects the contacts 492 to a "Roll Drives" switch 464 which has a pair of parallel contacts 466 and 468 thereon that can be selectively closed in a manner such that only the contacts 466 are closed, or the contacts 468 are closed, or both sets of contacts are closed. The contacts 468 are connected through a line 473 to the relay 470 which has one side thereof grounded. The switch contacts 466 are similarly connected through a line 463 to the relay 460 which has the other side thereof grounded. It will be seen, therefore, that when the switch 522 is in the closed or in "Auto" position, a circuit is completed, upon actuation of the shear 54, through the line 524, the switch contacts 526, the line 530, the switch contacts 504, 492 and 466 and 468 to both of the relays 460 and 470. Energization of the relay 460 operates the motor starter 461 in a well-known manner not necessary to illustrate, whereby to begin operation of the acceleration roller motor 122 and, similarly, energization of the relay 470 causes operation of the motor starter 471 whereby to begin operation of the positioning roller motor 164.

If the switch 522 is placed in the manual or "Man." position whereby to open the line 524, manual control of the motors 122 and 164 can be obtained by means of a "Jog" switch 528 which connects the main line 520 to the line 530. The line 530 then bypasses the switch contacts 462 and 526 to operate the relays 460 and 470 to start the motors 122 and 164 if the contacts 504, 492 and 466 and 468 are closed, as is the normal case.

The microswitch 250, which is closed by the shock absorbing mat stop assembly when a mat has been positioned as desired with respect to the turning arms 70, forms a part of the electrical control circuit of FIG. 37 and has one terminal of the contacts thereof connected to the line 520. The other contact of the switch 250 is connected through a cam actuated switch 544 to a line 484 which connects with a time delay relay 480 having the other terminal thereof grounded. The time delay relay 480 is provided with a pair of contacts 482 which are in parallel with the contacts of the switch 250 whereby to provide a holding circuit around the switch 250 as long as the time delay relay 480 is operating.

Closure of the microswitch 250 also completes a circuit through the switch 544 and the line 484 to a pair of contacts 456 controlled by a relay 450. The contacts 456 are connected through a line 503 to a pair of contacts 502 controlled by a relay 500 and through a line 491 to a relay 490 having the other terminal thereof grounded. The relay 490 is adapted to open the contacts 492, whereby to interrupt the operation of the drive motors 122 and 164 by de-energizing the relays 460 and 470. The operation of the motors 122 and 164 can also be interrupted by energization of the control relay 500 which is placed in operation if either the switches 250 or 482 are closed and further provided that the relay 450 is operated to close the normally open contacts 458 that are connected to the line 484. The contacts 458 connect through a line 491 to a pair of contacts 494 which are connected through a line 547 to a cam operated switch 546 which, in turn, is connected, when closed, through a line 501 to the relay 500, the other terminal of which is grounded. It will be seen, therefore, that closing of the switch 458 when either of the switches 250 or 482 is closed can serve to operate the relay 500 whereby to open the switch contacts 502 and 504, the contacts 502 interrupting the circuit to the relay 490 and the contacts 504 interrupting the circuit to the motor control relays 460 and 470. Conversely, the relay 490 by means of the switch contacts 494 controls the operation of the relay 500.

Control of the operation of the solenoid valves 324 and 340 is obtained by means of the relays 500 and 490, respectively. The relay 500 has a pair of contacts 506 and 508 which are normally open but which are closed upon operation of the relay 500 to connect the coils of the solenoid valves 324 between the lines 401 and 403 to apply on operating potential thereto. The relay 490 has a pair of normally open contacts 496 and 498 thereon which are also connected so that when closed they will place the coils of the solenoid valves 340 across the lines 401 and 403 so as to apply an operating potential thereto.

The desired automatic operation of the machine whereby either to turn all mats handled thereby or to transfer all mats by lateral sliding, or alternately to turn and slidably transfer the mats is controlled by a mat selector switch 550 which has three pairs of switch contacts thereon, namely, contacts 552, 554 and 556. The switch is of a standard and well-known construction such that it has the following three positions: when the switch is placed in the "Turn" position only the contacts 554 are closed; when it is in the "Trans" position only the switch contacts 552 are closed; and when it is in the "Auto" position only the switch contacts 556 are closed. The circuit for operation in the "Trans" position is made from the switch contacts 552 through a line 551 to a control latching relay 450 having two separate coils 450L and 450UL which are poled oppositely so that when one is energized the contacts on the relay are moved in one direction and when the other is energized the relay contacts are moved to the other position and held there until the other coil is energized. The connection of the line 551 is made through the coil 450L which has the other terminal thereof grounded and which when energized moves and latches the switch contacts in the "transfer" position whereby to cause sliding transfer of the mats upon operation of the turn-transfer units 150. Connection is also made from the line 551 through a pair of normally closed contacts 452 controlled by the relay 450, through a line 431, a pair of normally closed contacts 432, and a line 555, to a control relay 430.

If the switch 550 is placed in the "Turn" position, the switch contacts 554 being closed will provide a connection through a line 553 to the relay coil 450UL having the other side thereof grounded and operating in opposition to the relay coil 450L described above. The relay 450 also has a pair of contacts 454 which, when closed, provide a connection between the line 553 and a line 433 to a pair of contacts 434 on the relay 430 and to the line 555, and thence to the relay 430.

When operating with the switch 550 in the "Auto" position, connection is made from the line 520 to a cam operated switch 540 completing a connection to the line 541. One connection from the line 541 is through the switch 556 to the line 555 so as to energize the relay 430. Another connection from the line 541 is made through a cam operated switch 542, when closed, to a line 441 connecting with a second time delay 440 which has the other terminal thereof connected to ground. The time delay relay 440 has a pair of contacts 442 thereon which are normally open and which, when closed, provide a direct connection from the line 520 to the line 541, thus bypassing the switch 540 and permitting operation of the relay 430 regardless of the position of the cam operated switch 540.

The major portions of the control circuit for the D.C. drive motor 190 are shown in FIG. 38 of the drawings, with certain portions thereof also shown in the A.C. control circuit of FIG. 37. The motor 190 is powered from a D.C. source including a positive terminal 600 and a negative terminal 602 which are provided with switches 604 and 606, respectively. The switch 604 is connected by a line 608 to an overload relay 620, which is in turn connected to a line 621. The line 621 is connected to a first forward field coil 701 that is connected through a pair of relay contacts 702 to a line 623. Also connected to the line 621 is a first reverse field coil 721 which is connected through a pair of contacts 722 to a line 625. Disposed between the lines 623 and 625 are the brushes 626 contacting the commutators 624, all of which are in series with a commutator field coil 628. Also connected across the lines 623 and 625 there is a dynamic brake including a dynamic brake resistor 783 in series with a dynamic brake coil 781 which, in turn, is in series with a pair of relay contacts 782. The line 623 is further connected, through a pair of contacts 732 in series with a second reverse coil 731, to a line 627. The line 625 is connected, through a pair of relay contacts 712 in series with a second forward coil 711, to the line 627.

The line 627 is connected to the coil of a series brake 634 which is connected through a line 635 to a field relay 790 that is in series with the accelerating resistors 636, 638 and 646. The usual shunt circuits are provided around the accelerating resistors, the circuit around resistor 636 including a pair of normally open relay contacts 752, the shunt circuit around the resistor 638 containing a pair of normally open switch relay contacts 762, and the shunt circuit around the resistor 746 including a pair of normally open relay contacts 772 as well as a starting series field coil 648. The accelerating resistors further are in series with a stabilizing field coil 650 which is connected through a pair of main line contacts 742 and a second overload relay coil 630 to the negative line switch 606.

A shunt field coil 612 is also provided for the motor 190 and is connected at one end thereof to the line 608 and at the other end to a line 613 which connects with a field rheostat 614. The field rheostat 614 is, in turn, in series with a field relay 800 connected by a line 610 to the negative switch 606. A pair of contacts 792 on the relay 790 and a pair of contacts 784 on a dynamic brake relay 780 are provided in parallel with each other and with the field rheostat 614. A discharge resistor 616 is provided across the entire motor circuit, the resistor being connected at one end thereof to the line 608 and at the other end thereof to a line 617 connecting with a switch 618 which, in turn, is connected to the negative line switch 606.

An overload circuit and a line voltage relay are also provided. More specifically, the terminal 600 connects with a switch 652 which is in turn connected to a fuse 654 that connects to a line 653. The line 653 leads to a pair of switch contacts 642 and 656 which are arranged in parallel, the switch contacts when closed connecting to a line 655 which, in turn, is connected to a low voltage relay 640. The relay 640 is connected through a line 664 to a pair of contacts 632 on the second overload relay 630 which are, in turn, connected through a line 663 to a pair of contacts 622 on the first overload relay 620, the contacts 622 being connected to the line 661 through a line 662 and through a pair of contacts 802 on the relay 800. The negative line 602 is connected to the relay contacts 802 through a switch 658, a fuse 660 and the line 661, the line 661 being the principal negative control line.

From the above it will be seen that operation of either of the two overload relays 620 or 630 or of the field relay 800 will interrupt operation of the relay 640 thereby opening the contacts 642. Since the line 655 also supplies all of the potential for the motor control circuits to be described hereafter, no further operation of the motor circuit can be obtained until the reset contacts 656 are closed whereby to re-energize the relay 640, thus closing the contacts 642 thereof.

The portion of the D.C. control circuit which cooperates with and is controlled by the A.C. control circuit described above will now be explained in detail. The contacts 486 on the first time delay relay 480 shown in FIG. 37 are also found in the D.C. control circuit of FIG. 38 and are normally open as illustrated therein. When closed, the contacts 486 interconnect the main positive control line 655 with a line 805 which in turn connects with a cycle limit forward switch 804 which is cam operated. The switch 804, when closed, connects through a line 803 to a pair of contacts 734 forming a part of a relay 730 to be described hereafter. In turn the contacts 734 are connected through a line 735 to the two forward coil relays 700 and 710 which are disposed in parallelism with each other and have their other sides connected to the main negative supply line 661. Accordingly, when the time delay relay 480 (FIG. 37) is closed and the switches 804 and 734 (FIG. 38) are closed, the relays 700 and 710 will be operated whereby to close the relay contacts 702 and 712 described above and to place the forward windings 701 and 711 in operation to cause forward operation of the motor 190, whereby to pivot the turning arms 70 from the "reset" or terminal position toward the half cycle position.

Reverse movement of the motor 190 is accomplished by the closing of the time delay relay 440 found in FIG. 37, whereby to close the contacts 444 thereof which are found in FIG. 38. The contacts 444 interconnect the line 655 and a line 807 which, in turn, is connected in series with a cycle limit reverse switch 806, which is cam operated, and with a pair of relay contacts 704 controlled by the relay 700 described above. The relay contacts 704 are in turn connected through a line 707 to a pair of reverse relays 720 and 730 which are connected in parallel and have the other terminals thereof connected to the negative line 661. Closure of the switch contacts 444 and 806 and the relay contacts 704, accordingly, will cause operation of the reverse relays 720 and 730 whereby to close the contacts 722 and 732 thereof to energize the reversing coil 721 and 731 to cause reverse operation of the motor 190. This will cause the turning arms 70 to move from their half cycle or extended position toward the reset or terminal position of FIG. 25.

The main line switch contacts 742 are controlled by a relay 740 connected at one side thereof to the line 655 and at the other side thereof through a line 657 and through relay contacts 644 to the negative line 661. The relay contacts 644 are on the relay 640 which is the line voltage relay described above. Accordingly, if the line voltage is proper, the main line relay 740 will be closed, whereby to close the contacts 742 to permit operation of the motor 190.

The accelerating control mechanism is also connected between the lines 655 and 661 and includes a pair of normally closed manually operated switch contacts 774 and 784 which in turn connect through a line 809 to a pair of parallel cam operated switches 808 and 810 which are the slow down forward switch and the slow down reverse switch, respectively, these switches being cam operated. The switches 808 and 810 are respectively connected to a line 785 through relay contacts 706 and 724 which are respectively controlled by the relays 700 and 720. The line 785 is in turn connected to a pair of relay contacts 786 controlled by the dynamic braking relay 780 and is also connected to a 275 ohm resistor 794 in parallel with the relay contacts 786. The other side of the contacts 786 is connected through a line 783 to the dynamic braking relay 780 which is in turn connected to the negative line 661 by the line 657 having a pair of contacts 644 therein which are controlled by the line voltage relay 640.

The line 785 is also connected to the three accelerating relays 750, 760, and 770, the relay 750 being connected through relay contacts 788 controlled by the dynamic braking relay 780, the relay 760 being connected through a pair of relay contacts 754 controlled by the accelerating relay 750, and the relay 770 being connected through a pair of contacts 764 controlled by the accelerating relay 760. The other side of each of the relays 750, 760 and 770 is connected to the negative line 661.

Means is provided to obtain manual control in both the forward and reverse directions for the drive motor 190, this means being comprised of manually operated switches 770 and 780, the switch 770 being designated the "jog forward" switch and the switch 780 being designated the "jog reverse" switch. The jog forward switch 770 controls a pair of switch contacts 772 which when closed are in parallel with the time delay relay contacts 486 whereby to close the circuit to the forward run relays 700 and 710 to begin operation of the motor 190 in the forward direction. The switch 770 also controls the contacts 774 which, when opened, interrupt the circuit to the accelerating relays 750, 760 and 770.

The jog reverse switch 780 has a first pair of contacts 782 which are in parallel with the time delay relay contacts 444 so that when the contacts 782 are closed, a circuit is completed for the reverse relays 710 and 720 and the motor 190 is energized in the reverse direction. Also controlled by the jog reverse switch 780 are the contacts 784 which, when opened, break the circuit for the three accelerating relays 750, 760 and 770 whereby to give manual control for the operation of the motor 190.

The cam operated switches 540, 542, 544 and 546, illustrated in FIG. 37 of the drawings, and the four cam operated switches 804, 806, 808 and 810, illustrated in FIG. 38 of the drawings, are all contained within a cam switch control box 820 (see FIG. 14), which is mounted on the frame of the turn-transfer unit 150A and has the actuating cams thereof mounted upon or controlled by the turning arm drive shaft 72 thereof. Accordingly, the actuating cams for these switches will be turned 180° in one direction during the first half cycle of operation and will be turned 180° in the opposite direction during the second half or reset cycle of operation of the machine. The time of closure of the switches 540, 542, 544 and 546 is diagrammatically illustrated in FIG. 34 of the drawings wherein it will be seen that the switch 540 is closed during approximately the last 20° of rotation of the turning arms 70 during the turn-transfer cycle and during the first 20° of the reset cycle. The switch 542 is closed at approximately the 5° point of operation in the turn-transfer cycle and is opened after 175° of operation of the reset or returning cycle. Each of the switches 540 and 546 is normally closed at the beginning of a turn-transfer cycle, the switch 544 being opened at approximately the 160° point of operation and the switch 546 being opened after 40° of operation.

In FIG. 35 it will be seen that each of the switches 804 and 808 is normally closed at the beginning of a turn-transfer cycle and is subsequently opened, the switch 804 being opened at the 175° point of operation and the switch 808 being opened at the 120° point of operation. The switches 806 and 810 are opened at the beginning of a turn-transfer cycle and are subsequently closed, the switch 806 being closed at approximately the 5° point of operation and the switch 810 being closed at the 20° point of operation, both of the switches remaining closed for the remaining portion of the turn-transfer cycle.

If desired, a counter may be placed in circuit with the control switch 526 in the shear control panel 58 whereby to stop the operation of the welding machine 52 and of the turn-transfer mechanism 50 after a predetermined number of mats have been produced and stacked. The counter is connected so as to prevent operation of the switch 526 or to interrupt the connections thereof to the lines 524 and 530 (see FIG. 37), thereby effectively interrupting the operation of the turn-transfer mechanism 50.

*Operation*

The operation of the turn-transfer mechanism 50 will now be described, with special reference to FIGS. 6–14 and 34–38. The mechanism 50 is first adjusted with respect to the welding machine 52 with which it is to be used and suitable connections are made between the lines 524 and 530 (FIG. 37) and the switch 526 and counter, if used, of the shear controls 58 of the welding machine. The adjustable locking fingers 92 are suitably positioned by turning the hand crank (FIGS. 23 and 24) to accommodate the size of mat to be made and stacked by the machine. The stop assembly 222 is also adjusted and positioned in accordance with the size and shape of the mats to be handled. Next, a plurality of stacking timbers 822 may be provided on the conveyor 64, and finally, suitable potentials are applied to the lines 400 and 600—602.

If automatic alternating turn and transfer operation is to be obtained, the switch 514 (FIG. 37) is placed in the "On" position, the feed rolls switch 522 is moved to the "Auto" position, the mat selector switch 550 is turned to the "Auto" position, and the roll drive switch 464 is put in the "Both" position so that both the accelerating rolls 110 and the positioning rolls 158 will be driven in handling the mats about to be made and stacked. These positions of the various switches and the accompanying positions of the switch contacts and the roller contacts are illustrated by solid lines in FIGS. 37 and 38. The parts and contacts are also shown in solid lines in position such as to cause the first mat to be received to be turned as it is handled and stacked by the machine.

As the first mat formed comes out of the mat welding machine 52, the shear mechanism 54 will operate in the manner common in such welding machines so as to cut the line wires at the rear end of the mat. Operation of the shear will cause the shear control 58 to close the switch contacts 526, whereupon operation of the machine of the present invention will begin. Closing of the switch contacts 526 will complete a circuit from the main control line 520 through the switch 522, the line 524, the switch 526, the line 530, the relay contacts 504 and 492, and the switch contacts 466—468 to the drive roller relays 460 and 470. The relay 460 will operate the motor starter 461 for the accelerating motor 122 whereby to cause operation of the accelerating rollers 110 and to feed the newly formed mat to the left, as viewed in FIG. 14 and laterally toward and against the control wheels 130 due to the angular position of the rollers 110. Simultaneously, the relay 470 will close the contacts in the motor starter 471 whereby to start the positioning motor 164 and begin operation of the positioning rollers 158. The rollers 158 will receive the mat from the rollers 110 and will continue feeding the mat to the left, as seen in FIG. 14, and against the control wheels 170 which will be retained in their upper or active controlling position by reason of the fact that the turning arms 70 will then be positioned downwardly in the reset position thereof.

The leading end of the mat will next contact the fingers 238 on the mat stop assembly 222 and thus close the microswitch 250. Closure of the microswitch 250 (see FIG. 37) will complete a circuit from the main supply line 520 through the switch 250, the cam actuated switch 544 (which is then closed, see FIG. 34), the line 484, the relay contacts 456 and 502 and the line 491 to the control relay 490. The relay 490 will thus be energized immediately to open the switch contacts 492, thereby interrupting the circuit for the roller relays 460 and 470 to stop operation of the accelerating motor 122 and the positioning roller motor 164 and thereby stop the drive of the mat. The relay contacts 494 will be opened upon the energization of the relay 490 and the relay contacts 496 and 498 will be closed, whereby to energize the solenoid control valves 340 (see FIG. 36) to cause expansion of the hydraulic motors 252 and 272 thereby to move the locking fingers 90 and 92 into locking engagement with the mat. This locking of the fingers 90 and 92 upon the edge line wires of the mat, it will be understood, is necessary in order that the turning of the mat (FIGS. 10 to 13) may next take place. The mat, now locked to the turning arms 70 by the fingers 90 and 92, is in position for the mat turning operation which follows automatically.

Simultaneously with the energization of the control relay 490, the time delay relay 480 is also energized by a circuit including the main line 520, the mat control switch 250, the cam actuated control switch 544 and the line 484. The delay relay 480 is slow acting so as to permit full operation of the relay 490 and the solenoid control valve 340 and to insure that the fluid motors have sufficient time to move the fingers 90 and 92 into their full mat gripping position. After the predetermined lapse of time, the delay relay 480 acts to close the relay contacts 482 and 486. The contacts 482, as previously indicated, form a by-pass around the microswitch 250 so that the circuits for the control relay 490 and the time delay relay 480 will remain closed for substantially the entire mat turning operation and until interruption by the opening of the cam actuated switch 544 at approximately the 160° point of the turning cycle.

Closure of the contacts 486 on the time delay relay 480 (see particularly FIG. 38) will complete a circuit for the forward relays 700 and 710 from the main positive control line 655 through the relay contacts 486, the line 905, the limit switch 804, the line 802, the relay contact 734, and the line 735, to the negative line 661. Actuation of the relays 700 and 710 will immediately close the contacts 702 and 712 whereby to energize the forward coils 701 and 711 for the motor 190. Assuming that all other operating conditions for the motor 190 are satisfied, such as proper voltage, the motor will now begin to operate in the forward direction. The motor 190, acting through the gear reducing unit 188 and the shaft 186, will drive each of the unit gear reducers 184 in the forward direction. As a result, the main turning shafts 72 will begin to turn and will carry the turning arms 70 therewith from the position illustrated in FIG. 10 of the drawings, to that illustrated in FIG. 11 (see also FIG. 25). The transfer slide 76 will be carried to the right, as viewed in those figures, toward the fully extended position and the transfer cylinders 96 will be pivoted, although they will perform no function during this mat turning operation. The relay 700 in addition to closing the contact 702 will open the contact 704 to prevent inadvertent reverse operation and further will close the relay contact 706 to initiate the sequence of operations to accelerate the main drive motor 190. The acceleration circuit illustrated is a standard four-step D.C. acceleration circuit under the control of the relays 740, 750, 760, 770 and 780. The relay 740 is also closed whereby to close the contact 742 before the motor 190 has the forward coils 701 and 711 thereof energized. Closure of the contacts 706 will energize the relay 780 which will open the contacts 786 and will close the contacts 784 whereby to energize the relay 750. Energization of the relay 750 will close the contact 752 whereby to remove the accelerating resistor 636 from the motor circuit thereby increasing the speed of operation of the motor 190. Operation of the relay 750 also closes the relay contact 752 which completes a circuit to energize the relay 760. Actuation of the relay 760 closes the relay contact 762 whereby to remove the accelerating resistor 638 from the motor circuit, thus further increasing the speed of operation of the motor 190. The relay 760 also upon actuation thereof closes the relay contacts 764 to complete the circuit for the relay 770. The relay 770 upon operation thereof will close the contact 772 thus removing the resistor 646 and the series field coil 648 from the motor circuit further to increase the speed of operation of the motor 190.

The above described acceleration of the motor 190 is maintained until the 120° point of rotation of the turning arms 70 is reached at which time the cam limit switch 808 is opened whereby to de-energize the relays 750, 760, 770 and 780. This immediately opens all of the contacts 752, 762 and 772 whereby to place all of the accelerating resistors in the motor circuit and further to open the relay contacts 782 whereby to apply the dynamic brake to the motor 190 and thus initiate deceleration thereof. When the turning arms 70 reach the 175° point of rotation, the cam actuated switch 804 is opened whereby to interrupt the circuit to the forward relays 700 and 710, thus opening the relay contacts 702 and 712 to de-energize the forward field coils 701 and 711 of the motor 190. This further serves to de-energize the series brake 634 of the motor, the brake 634 holding the mat turning arms 70 in the half cycle or horizontal position and disposed 180° from the reset or starting positions.

As the turning arms 70 are rotated to the 180° position described above, the transfer slides 76 are moved outwardly, or toward the right, as viewed in FIGS. 10–13 and the retainers 93 thereon are in the upstanding or vertical position. At the 175° point of turning of the arms 70, the hook 292 on the control rod 288 engages the retractor stop 294 whereby to lower the retainer 93, as illustrated in FIGS. 19 and 31 of the drawings. At this 175° point of operation, the limit switch 540 is also closed and completes a circuit from the line 520 through the switch 540, the switch contacts 546 of the mat selector switch 550, the line 555, the normally closed relay contacts 432 and the normally closed relay contacts 452 to the latching side of the relay 450 and particularly coil 450L thereof. This actuates the relay 450 from the "turn" position in which it has been formerly to the "transfer" position to set up the circuit components for the next cycle which is to be a "transfer" cycle. More particularly, the relay contacts 452 and 456 which have heretofore been closed will now be opened and the relay contacts 454 and 458 will be closed, all in preparation for the next cycle which will be a transfer cycle.

Closure of the switch 540, in addition to energizing the relay 450, serves to energize the relay 430 by a circuit from the line 520 through the switch 540, the switch contacts 556 and the line 555. This serves to open the switch contacts 432 and 434, this occurring subsequent to the movement of the parts of the relay 450 to the "transfer" position as described above.

The opening of the contacts 456 of the relay 450 will de-energize the control relay 490 whereby to open the relay contacts 496 and 498. This will de-energize the solenoid valve 340 admitting air into the lines 346 and venting the lines 350 to the atmosphere through the control valve 352 whereby to move the locking fingers 90 and 92 from the locking to the unlocking position. This occurs at the 180° cycle of operation so that the mat is released on to the extended transfer slides 76 at the half cycle position of 180°.

Prior to the arrival of the turning arms 70 at the 180° position and prior to the release of the mat therefrom, the closure of the cam actuated control switch 540 completes yet a third circuit from the line 520 through the closed control switch 542. This circuit serves to energize the second time delay relay 440. This relay is constructed so that it closes the contacts 442 and 444 thereof after the mat has been dropped from the turning arms 70 at the half cycle or 180° position. Closure of the switch contacts 442 forms a by-pass around the switch 540 so that the de-energization of the relay 440 is under the control of the switch 542.

Referring now particularly to FIG. 28 of the drawings, it will be seen that the closure of the time delay relay contacts 444 will energize the reversing relays 720 and 730 of the D.C. drive motor 190. More particularly, a circuit is established from the line 655 through the contacts 444, the line 807, the cam actuated switch 806, the line 705, the normally closed relay contact 704 and the line 707 through the relays 720 and 730 to the negative line 661. Operation of the relays 720 and 730 will immediately close the relay contacts 722 and 732 whereby to energize the reversing motor coils 721 and 731. This begins operation of the motor 190 with the full accelerating resistance in the motor circuit. Operation of the relay 720 also closes a circuit from the positive line 655 through the normally closed switch contacts 774 and 784, the line 809, the presently closed cam actuated switch 810 and the line 785 to the four step accelerating circuit for the motor 190, the operation of which has been described above with respect to the forward relays 700 and 710. The acceleration of the motor 190 is accomplished as well as the closing of the relay contact 782 whereby to remove the dynamic brake from the motor circuit.

Acceleration under the control of the relays 750, 760, 777 and 780 continues until the turning arms have returned 160° or to the 20° cycle position. During this time the transfer slides 76 are retracted from beneath the associated mat 30. The control line wire 100 on the mat is engaged by the transfer slide strippers 300 and particularly by the teeth 306 thereof to hold the adjacent edge of the mat in the deposited position while the transfer slides 76 are retracted from beneath the mat, this being facilitated by the transfer stripper roller 204 carried on the ends thereof. As the transfer slides 76 reach the fully retracted position, the edge of the mat disposed against the stripper 300 falls downwardly therealong across the inclined surfaces of the teeth 306, the opposite edge of the mat having been deposited upon the stack progressively as the transfer slides 76 are withdrawn from therebeneath.

At approximately the 20° cycle position, or 160° after the beginning of the reversing cycle, the cam limit switch 810 is opened whereby to interrupt the circuit to the accelerating relays 750, 760, 770 and 780. This immediately places the full starting resistance in the motor circuit, applies the dynamic brake and thus substantially decelerates the motor 190 and the parts driven thereby.

At the 5° point of rotation, or after 175° of reverse operation, the switch 806 is operated whereby to interrupt the circuit to the relays 720 and 730, thus removing the reverse field coils 721 and 731 from the motor circuit and thus stopping the operation of the motor. In addition, this serves to de-energize the series brake 634 thus positively applying a braking action to the motor 190 which serves mechanically to hold the entire mat turning mechanism including the arms 70 in the 0° or reset position.

The parts are now in condition to receive another mat and to initiate a mat transfer cycle. The next operation of the shear 54 will again close the switch 526 whereby to cause operation of the accelerating motor 122 and the positioning motor 164 to cause the accelerating relays 110 and the positioning relays 158 to move the mat into the desired position and against the stop assembly 222 whereby to close the microswitch 250. Closure of the switch 250 serves to energize the relays 460 and 470. Since the relay 450 is in the "transfer" position, the relay contacts 458 are closed and the relay contacts 456 are opened. Accordingly, a first circuit will be provided from the line 520 through the switch 250, the closed cam actuated switch 544, the relay contacts 458, the relay contacts 494, the closed cam actuated switch 546 and the line 501 through the control relay 500. Operation of the control relay 500 serves to open the relay contacts 502 and 504 thereof, the contacts 502 further interrupting the circuit to the control relay 490. Opening of the relay contacts 504 interrupts the circuit to the motor starting relays 460 and 470 whereby to stop operation of the drive motors 122 and 124, as has been described above in respect to the mat turning operation.

Actuation of the relay 500 also serves to close the relay contacts 406 and 508, thus connecting the solenoid valves 324 across the lines 401—403. Referring to FIG. 36 it will be seen that this will begin expansion of each of the four transfer motors 96 whereby to move the transfer fingers 94 outwardly with respect to the motors 96. This movement of the transfer fingers is coordinated with the downward pivoting movement of the motors 96, as is illustrated in FIG. 9A of the drawings, as the turning arms 70 are pivoted and the transfer slides 76 move upwardly. More specifically, the transfer fingers 96 engage the control line wire 100 and move it along the "transfer line," illustrated in FIG. 9A, whereby to deposit the control line wire 100 upon the transfer slides 76 and against the retainer 93 thereon. This complete transfer operation is achieved during the first 40° of rotation of the turning arms 70, as will be described more fully hereinafter.

Closure of the microswitch 250, in addition to energizing the relay 500, also energizes the time delay relay 480 by completing a circuit from the line 520 through the switch 250, the line 532, the closed switch 544 and the line 484. Operation of the relay 480 closes the holding contacts 482 around the microswitch and further closes the relay contacts 486 whereby to begin operation of the D.C. drive motor 190, see FIG. 28. The operation of the circuit of FIG. 38 is substantially identical in the transfer cycle with that which has been described above in the turning cycle and therefore in the interest of brevity those portions of the operating cycle which are identical will not be described in detail. Closure of the relay contacts 486 energizes the forward motor field coils 701 and 711 and rotation of the turning arms 70 and the outward movement of the transfer slides 76 is begun. At the 40° point of operation, the switch 546 is opened (see FIG. 27) whereby to interrupt operation of the relay 500 and to open the relay contacts 506 and 508. During this first 40° cycle of operation, the transfer fingers 94 have been effective to transfer the control line wire 100 from the turning arms 70 on to the transfer slides 76 and against the retainers 93 thereof. De-energization of the solenoid valves 324 permits the springs therein to return the parts to a position such that air is admitted under pressure into the lines 328 (see FIGURE 26) and the lines 326 are vented to the atmosphere whereby to contract the motors 96 and to withdraw the transfer fingers 94 from beneath the position which the mat will assume when it is fully transferred.

Rotation of the turning arms 70 continues and at the 160° point of operation the cam actuated switch 544 is again opened whereby to interrupt the circuit to the time delay relay 480 whereby to open the contacts 482 and 486. Opening of the contacts 486 opens a circuit to the forward field coil relays 700 and 710 whereby to stop the forward drive of the motor 190 and to apply the dynamic brake thereto to begin deceleration thereof. At the 175° point of rotation of the turning arms 70, the cam actuated switch 804 (see FIG. 28) is opened whereby to insure that the circuit to the forward relays 700 and 710 is opened.

At the 160° point of rotation of the turning arms 70 the control switch 540 is closed whereby to establish a connection from the line 520 through the switch 540, the line 541, the switch contacts 556, the line 555, the relay contacts 434 and 454 and the coil 450UL to move the relay 450 to the unlatched position corresponding to the "turn" cycle whereby again to close the relay contacts 452 and 456 and to open the relay contacts 454 and 458. The contacts will stay in this position until the relay 450 is again energized during the next cycle of operation.

Closure of the switch 540 also establishes a connection through the line 555 to the control relay 430 which serves to open the contacts 432 and 434 after the relay 450 has been actuated. The parts are now in condition for a subsequent mat turning operation.

Again the turning arms 70 will be held in a horizontal extended position upon the opening of the switch 804 since the de-energization of the relays 700 and 710 serves to operate the series brake 634 which holds turning shafts 72 in the corresponding position. The switch 542 is closed and accordingly a connection is made in the line 520 through the switch 540, the line 541, the switch 542 and the line 441 to the second time delay relay 440 whereby to close the relay contacts 442 and 444. The relay contacts 442 form a by-pass about the switch 540 which will be opened after 20° rotation of the turning arms 70.

The contacts 444 when closed energize the reverse motion coils of the motor 190 (see FIG. 28) whereby to cause acceleration of the motor 190 in the reverse direction as has been explained above in respect to the mat turning operation. Again the retainer 93 has been moved to the non-contacting or down position at approximately 175° of the outward movement of the slides 76 so that upon reverse movement of the motor 190 and the turning arms 70, the slides 76 are free to move inwardly again and the mat is stripped therefrom over the roller 204 and the control line wire 100 of the mat is held in the proper position by the stripper 300 in the same manner as was the mat which was turned as described above. At approximately the 40° point of rotation or after the turning arms 70 have been rotated in the reverse direction 140°, the pin 216 (see FIG. 16) contacts the arm 212 of the lever 210 to pivot the transfer cylinders 96 from the horizontal position to the position illustrated by solid lines in FIG. 16 as the transfer slides 76 move to the fully retracted position. When the parts arrive at the 20° point of rotation, the switch 810 is opened and the acceleration of the motor 190 in the reverse direction is stopped. Thereafter, at the 5° point of rotation the switch 806 and the switch 542 are both opened, opening of the switch 806 interrupts the circuit to the reverse direction relays 720 and 730 and opening of the switch 542 likewise interrupts this circuit by de-energizing the time delay relay 440 and thus opening the relay contacts 444. This applies the series brake 634 to the parts to hold them in the zero° or reset position.

Because the relay 450 has been placed in the unlatched position whereby to close the relay contacts 452 and 456 and to open the relay contacts 454 and 458, the next closure of the shear control switch 526 will initiate an automatic mat turning cycle of the turn-transfer mechanism 50. It will be seen that this operation can be repeated indefinitely until interrupted by the counting mechanism in the shear control 58, or until manually interrupted by the operator.

If it is desired to turn all the mats produced by the welding machine 52, the mat selector switch 550 is placed in the "turn" position whereby to close the switch contacts 554 and to open the switch contacts 556. With the parts so positioned, it will be seen that the relay 450 is always held in the mat turning position and, therefore, all other parts of the machine operate as described above for the mat turning portion of the operating cycle. Should it be desired, on the other hand, to have all mats transferred without turning, the mat selector switch 550 is placed in the "trans" position which serves to close the switch 552 and open the switch contacts 554 and 556. This will place the control relay 450 in the transfer position and will hold it in that position whereby the contacts 452 and 456 are held open and the contacts 454 and 458 are held closed. The machine will perform a transfer operation thereafter each time that the shear control switch 526 is closed followed by a closing of the mat stop microswitch 250.

After a suitable stack of the mats 30 has been produced on the stacking area 62, they can be readily moved along the conveyor 64 to the banding and shipping area 66. Suitable strappings 68 can be applied thereto whereby the stack of mats is in condition for shipping or storage.

It will be seen that there has been provided an apparatus for alternately transferring and turning and stacking reinforcing metal fabric mats and the like which fulfills all of the objects set forth above and which performs the method set forth above. Although one preferred embodiment of the invention has been illustrated and described, it is to be understood that various changes and modifications may be made therein without departing from the scope of the following claims.

We claim:

1. In a machine for receiving mats and stacking the same in a predetermined stacking location, the combination comprising a first mat support mounted for reciprocating pivotal movement through an arcuate path between a mat receiving position alongside the stacking location and a mat discharging position overlying the stacking location, a second mat support mounted for reciprocating movement into and out of said mat discharging position along a substantially straight-line path beneath said arcuate path of said first mat support, drive means for simultaneously moving said first and second mat supports through their respective paths first in a forward stroke toward said discharge position and then in a return stroke away from said discharge position, mat gripping means on said first mat support, means for operating said mat gripping means to clamp a mat upon said first mat support during said forward stroke thereof to cause said mat to be carried bodily by said first mat support through said arcuate path from said mat receiving position to said mat discharging position and to cause said mat to be deposited in an upside-down condition upon said second mat support at said mat discharging position, and means for retaining said mat in said mat discharging position during the return stroke of said second mat support whereby said second mat support will be withdrawn from beneath said mat and said mat may thereupon drop onto the stacking location.

2. In a machine for receiving mats and stacking the same in a predetermined stacking location, the combination comprising a first mat support mounted for reciprocating pivotal movement through an arcuate path between a mat receiving position alongside the stacking location and a mat discharging position overlying the stacking location, a second mat support mounted for reciprocating movement into and out of said mat discharging position along a substantially straight-line path beneath said arcuate path of said first mat support, drive means for simultaneously moving said first and second mat supports through their respective paths first in a forward stroke toward said discharge position and then in a return stroke away from said discharge position, mat gripping means on said first mat support, means for operating said mat gripping means to clamp a mat upon said first mat support during said forward stroke thereof to cause said mat to be carried bodily by said first mat support through said arcuate path from said mat receiving position to said mat discharging position and to cause said mat to be deposited in an upside-down condition upon said second mat support at said mat discharging position, and means for retaining said mat in said mat discharging position during the return stroke of said second mat support whereby said second mat support will be withdrawn from beneath said mat and said mat may thereupon drop onto the stacking location, said operating means including means for selectively deactivating said gripping means during said forward stroke of said first mat support so as selectively to provide an alternate mode of operation wherein a mat on said first mat support will be lifted by the pivotal movement thereof during said forward stroke and will slide downwardly off of said first mat support and onto said second mat support for delivery thereby in a face-upright condition to said mat discharging position.

3. In a machine for receiving mats and stacking the same in a predetermined stacking area, the combination comprising a first mat support pivotally mounted for reciprocating cyclic movement through an arcuate path between a mat receiving position alongside the stacking area and a mat discharging position overlying the stacking area, a second mat support mounted for reciprocating cyclic movement through a substantially straight-line path beneath said arcuate path and between said mat receiving position and said mat discharging position, and drive means for simultaneously moving said first and second mat supports through their respective paths from said mat receiving position to said mat discharging position, a mat received in said mat receiving position being adapted to be lifted by the pivotal movement of said first mat support and to be slid thereby onto said second mat support during the simultaneous movement of said supports for transport by said second mat support to said mat discharging position.

4. In a machine for receiving mats and stacking the same in a predetermined stacking area, the combination comprising a first mat support mounted for cyclic pivotal movement through an overhead arcuate path between a substantially horizontal mat receiving position alongside the stacking area and a substantially horizontal mat discharging position overlying the stacking area, a second mat support mounted for cyclic movement through a substantially straight-line horizontal path beneath said arcuate path and between said mat receiving and discharge positions, drive means for simultaneously moving said first and second mat supports through their respective paths in a forward stroke from said mat receiving position to said mat discharging position and then on a return stroke back to said mat receiving position, a mat received in said mat receiving position being adapted to be lifted by the pivotal movement of said first mat support during the forward stroke thereof and to be slid downwardly thereon onto said second mat support for delivery to said mat discharging position, and means for retaining said mat in said mat discharging position during the return stroke of said second mat support whereby said second mat support will be withdrawn from beneath said mat and said mat may thereupon drop onto said stacking area.

5. A mat stacking and transferring machine for stacking mats in a predetermined stacking area, comprising a first mat support pivotally mounted for movement between a first mat receiving position adjacent the stacking area and a second mat discharging position overlying the stacking area, a second mat supported mounted below said first mat support and movable from a first position beside the stacking area to a second mat receiving position beneath said second position of said first mat support, gripping means mounted on said first mat support and movable between a first mat gripping position and a second non-gripping position, and drive means for simultaneously moving said first and second mat supports between the first and second positions thereof to transfer mats therebetween and onto the stacking area, said machine turning the mats when said grippings means is in said first position and transferring the mats laterally without turning when said gripping means is in said second position.

6. A mat stacking and transferring machine for stacking mats in a predetermined stacking area, comprising a first mat support pivotally mounted for movement between a first mat receiving position adjacent the stacking area and a second mat discharging position overlying the stacking area, a second mat support mounted below said first mat support and movable between a first position beneath said first mat support in the first position thereof and a second mat receiving position beneath said first mat support in the second position thereof and overlying the stacking area, gripping means mounted on said first mat support and movable between a first mat gripping position and a second non-gripping position, and drive means for simultaneously moving said first and second mat supports between the first and second positions thereof to transfer mats therebetween and onto the stacking area, said machine turning the mats when said gripping means is in said first position during pivoting of said first support from the first to the second position thereof and said machine transferring the mats laterally when said gripping means is in said second position during the pivoting of said first support from the first to the second position thereof.

7. A mat stacking and transferring machine for stacking mats in a predetermined stacking area comprising a first mat support pivotally mounted for movement between a first mat receiving position adjacent to the stacking area and a second mat discharging position overlying the stacking area, a second mat support mounted below said first mat support and shiftable between a first position beneath said first mat support in the first position thereof and a second mat receiving position beneath said first mat support in the second position thereof and overlying the stacking area, gripping means mounted on said first mat support and movable between a first mat gripping position and a second non-gripping position, and drive means for simultaneously moving said first and second mat supports between the first and second positions thereof to move mats from said first mat support onto said second mat support, said machine turning the mats when said gripping means is in said first position and transferring the mats laterally when said gripping means is in said second position during pivoting of said first support from the first position to the second position thereof, said drive means withdrawing said second mat support from beneath the mat lying thereon during movement of the second mat support from the second position to the first position thereof whereby to deposit the mat in a predetermined position upon the stacking area.

8. A mat stacking and transferring machine for stacking mats in a predetermined stacking area comprising a first mat support pivotally mounted for movement between a first mat receiving position adjacent to the stacking area and a second mat discharging position overlying the stacking area, a second mat support mounted below said first mat support and shiftable between a first position beneath said first mat support in the first position thereof and a second mat receiving position beneath said first mat support in the second position thereof and overlying the stacking area, gripping means mounted on said first mat support and movable between a first mat gripping position and a second non-gripping position, retaining means mounted on said second mat support and movable between a first mat retaining position and a second non-retaining position, drive means for simultaneously moving said first and second mat supports between the first and second positions thereof to move mats from said first mat support onto said second mat support, said machine turning the mats when said gripping means is in said first position and transferring the mats laterally when said gripping means is in said second position during pivoting of said first support from the first position to the second position thereof, and means for placing said retaining means in the first position thereof during movement of said second mat support from the first position toward the second position thereof and for placing said retaining means in the second position during movement of said second mat support from the second to the first position thereof, said drive means withdrawing said second mat support from beneath the mat lying thereon during movement of the second mat support from the second position to the first position thereof whereby to deposit the mat in a predetermined position upon the stacking area.

9. A mat stacking and transferring machine for stacking mats in a predetermined stacking area comprising a first mat support pivotally mounted for movement between a first mat receiving position adjacent to the stacking area and a second mat discharging position overlying the stacking area, a second mat support mounted below said first mat support and shiftable between a first position beneath said first mat support in the first position thereof and a second mat receiving position beneath said first mat support in the second position thereof and overlying the stacking area, gripping means mounted on said first mat support and movable between a first mat gripping position and a second non-gripping position, retaining means mounted on said second mat support and movable between a first mat retaining position and a second non-retaining position, and drive means for simultaneously moving said first and second mat supports between the first and second positions thereof to move mats from said first mat support onto said second mat support, said machine turning the mats when said gripping means is in said first position and transferring the mats laterally when said gripping means is in said second position during pivoting of said first support from the first position to the second position thereof, means for placing said retaining means in the first position thereof during movement of said second mat support from the first position toward the second position thereof and for placing said retaining means in the second position during movement of said second mat support from the second to the first position thereof, said drive means withdrawing said second mat support from beneath the mat lying thereon during movement of the second mat support from the second position to the first position thereof whereby to deposit the mat in a predetermined position upon the stacking area, and means to prevent upward movement of the edge of the mat opposite said retaining means during withdrawal of said second mat support from therebeneath.

10. A mat stacking and transferring machine for stacking mats in a predetermined stacking area comprising a first mat support pivotally mounted for movement between a first mat receiving position adjacent to the stacking area and a second mat discharging position overlying the stacking area, a second mat support mounted below said first mat support and shiftable between a first position besides the stacking area to a second mat receiving position beneath said first mat support in the second position thereof and overlying the stacking area, gripping means mounted on said first mat support and movable between a first mat gripping position and a second non-gripping position, a transfer member mounted adjacent to said mat supports and movable from a first position engaging the edge of a mat on said first support in the first position thereof to a second position to deposit the engaged edge of the mat on said second mat support during movement from the first to the second position thereof when transferring mats without turning, and drive means for simultaneously moving said transfer member and said first and second mat supports between the first and second positions thereof to transfer mats therebetween and onto the stacking area, said machine turning the mats when said gripping means is in said first position and transferring the mats laterally when said gripping means is in said second position.

11. A mat stacking and transferring machine for stacking mats in a predetermined stacking area comprising a first mat support pivotally mounted for movement between a first mat receiving position adjacent to the stacking area and a second mat discharging position overlying the stacking area, a second mat support mounted below said first mat support and shiftable between a first position beside the stacking area to a second mat receiving position beneath said first mat support in the second position thereof and overlying the stacking area, retaining means mounted on said second mat support and having a first mat retaining position and a second non-retaining position, said retaining means being in the first position thereof during movement of said second mat support from the first toward the second position thereof and being in the second position thereof during movement of said second mat support from said second to said first position thereof, gripping means mounted on said first mat support and movable between a first mat gripping position and a second non-gripping position, a transfer member mounted adjacent to said mat supports and movable from a first position engaging the edge of a mat on said first support in the first position thereof to a second position to deposit the engaged edge of the mat on said second mat support and against said retaining means during movement from the first to the second position thereof when transferring mats without turning, and drive means for simultaneously moving said transfer member and said first and second mat supports between the first and second positions thereof to transfer mats therebetween and onto the stacking area, said machine turning the mats when said gripping means is in said first position and transferring the mats laterally when said gripping means is in said second position.

12. A mat stacking and transferring machine for stacking mats in a predetermined stacking area comprising a first mat support pivotally mounted for movement between a first mat receiving position adjacent to the stacking area and a second mat discharging position overlying the stacking area, a second mat support mounted below said first mat support and shiftable between a first position beside the stacking area to a second mat receiving position beneath said first mat support in the second position thereof and overlying the stacking area, retaining means mounted on said second mat support and having a first mat retaining position and a second non-retaining position, said retaining means being in the first position thereof during movement of said second mat support from the first toward the second position thereof and being in the second position thereof during movement of said second mat support from said second to said first position thereof, gripping means mounted on said first mat support and movable between a first mat gripping position and a second non-gripping position, a transfer member mounted adjacent to said mat supports and movable from a first position engaging the edge of a mat on said first support in the first position thereof to a second position to deposit the engaged edge of the mat on said second mat support and against said retaining means during movement from the first to the second position thereof when transferring mats without turning, drive means for simultaneously moving said transfer member and said first and second mat supports between the first and second positions thereof to transfer mats therebetween and onto the stacking area, said machine turning the mats when said gripping means is in said first position and transferring the mats laterally when said gripping means is in said second position, and control mechanism for selectively operating said drive means and said transfer member and said gripping means whereby selectively to operate said machine to turn all mats handled thereby and to transfer laterally all mats handled thereby and alternately to turn and to transfer mats handled thereby.

13. A mat stacking and transferring machine for stacking metal fabric mats in a predetermined stacking area comprising a pair of spaced apart turning arms mounted on a rotatable shaft, a pair of spaced apart transfer slides mounted below said arms, link means interconnecting said arms and said slides, drive means for turning said shaft simultaneously to move said arms and said slides between a first position adjacent to the stacking area and a second position overlying said stacking area, and gripping means mounted on said arms and movable between a first mat gripping position and a second non-gripping position, said machine turning the mats when said gripping means is in sad first position and transferring the mats laterally when said gripping means is in said second position during movement of said arms and said slides from the first position to the second position thereof.

14. A mat stacking and transferring machine for stacking metal fabric mats in a predetermined stacking area comprising a pair of spaced apart turning arms mounted on a rotatable shaft, a pair of spaced apart transfer slides mounted below said arms, link means interconnecting said arms and said slides, drive means for turning said shaft simultaneously to move said arms and said slides between a first position adjacent to the stacking area and a second position overlying said stacking area, gripping means mounted on said arms and movable between a first mat gripping position and a second non-gripping position, said machine turning the mats when said gripping means is in said first position and transferring the mats laterally when said gripping means is in said second position during movement of said arms and said slides from the first position to the second position thereof, and retaining means mounted on said slides and movable between a first mat retaining position and a second non-retaining position.

15. A mat stacking and transferring machine for stacking metal fabric mats in a predetermined stacking area comprising a pair of spaced apart turning arms mounted on a rotatable shaft, a pair of spaced apart transfer slides mounted below said arms, link means interconnecting said arms and said slides, drive means for turning said shaft simultaneously to move said arms and said slides between a first position adjacent to the stacking area and a second position overlying said stacking area, gripping means mounted on said arms and movable between a first mat gripping position and a second non-gripping position, said machine turning the mats when said gripping means is in said first position and transferring the mats laterally when said gripping means is in said second position during movement of said arms and said slides from the first position to the second position thereof, and a transfer member mounted adjacent to said arms in said slides and movable between a first position engaging the edge of the mat on said arms disposed toward said shaft and a second position on said slides during movement thereof toward the second position of said slides.

16. A mat stacking and transferring machine for stacking metal fabric mats in a predetermined stacking area comprising a pair of spaced apart turning arms mounted on a rotatable shaft, a pair of spaced apart transfer slides mounted below said arms, link means interconnecting said arms and said slides, drive means for turning said shaft simultaneously to move said arms and said slides between a first position adjacent to the stacking area and a second position overlying said stacking area, gripping means mounted on said arms and movable between a first mat gripping position and a second non-gripping position, said machine turning the mats when said gripping means is in said first position and transferring the mats laterally when said gripping means is in said second position during movement of said arms and said slides from the first position to the second position thereof, retaining means mounted on said slides and movable between a first mat retaining position and a second non-retaining position, and a transfer member mounted adjacent to said arms and said slides and movable between a first position engaging the edge of the mat on said arms disposed toward said shaft and a second position on said slides and against said retaining means during movement thereof toward the second position of said slides.

17. A mat stacking and transferring machine for stacking metal fabric mats in a predetermined stacking area comprising a pair of spaced apart turning arms mounted on a rotatable shaft, a pair of spaced apart transfer slides mounted below said arms, link means interconnecting said arms and said slides, drive means for turning said shaft simultaneously to move said arms and said slides between a first position adjacent to the stacking area and a second position overlying the stacking area, gripping means mounted on said arms and movable between a first mat gripping position and a second non-gripping position, said machine turning the mats when said gripping means is in said first position and transferring the mats laterally when said gripping means is in said second position during movement of said arms and said slides from the first position to the second position thereof, retaining means mounted on said slides and movable between a first mat retaining position and a second non-retaining position, a transfer member mounted adjacent to said arms and said slides and movable between a first position engaging the edge of the mat on said arms disposed toward said shaft and a second position on said slides and against said retaining means during movement thereof toward the second position of said slides, and control mechanism selectively operating said drive means and said gripping means and said transfer member selectively to turn all mats handled by said machine and to transfer all mats handled by said machine and alternately to turn and transfer mats handled by said machine.

18. A mat stacking and transferring machine for stacking metal fabric mats in a predetermined stacking area comprising a pair of spaced apart turning arms mounted on a rotatable shaft, a pair of spaced apart slides shiftably mounted below said arms, link means interconnecting said arms and said slides, drive means for turning said shaft simultaneously to move said arms and said slides between a first position adjacent to the stacking area and a second position overlying the stacking area, gripping means mounted on said arms and movable between a first mat gripping position and a second non-gripping position, retaining means mounted on said slides and movable between a first mat retaining position and a second non-retaining position, an hydraulic motor pivotally mounted adjacent to said shaft, second link means interconnecting said slides and said motor to move said motor between a first mat engaging position and a second mat depositing position, a transfer finger connected to said motor and shiftable upon actuation thereof from a first mat engaging position to a second mat depositing position, and control mechanism for selectively operating said drive means and said gripping means and said hydraulic motor selectively to turn all mats handled by said machine when said gripping means and said transfer finger are in the first positions thereof and to transfer mats when said gripping means and said transfer finger are moved to the second positions thereof.

19. A machine for handling and stacking in a predetermined stacking area metal fabric mats produced by a mat fabricating machine having a shear control mechanism, said handling and stacking machine comprising a mat accelerating conveyor adapted to receive a mat from the fabricating machine, a mat positioning conveyor mounted adjacent to said mat accelerating conveyor, a mat stacking mechanism mounted adjacent to said positioning conveyor and the associated stacking area and being operable to move mats from said positioning conveyor onto the stacking area, first drive means to operate said conveyors to move a mat along said accelerating conveyor and onto said positioning conveyor in a predetermined relationship to said mat stacking mechanism, a second drive means to operate said stacking mechanism, and machine control mechanism connected to the shear control mechanism and operable upon actuation thereof to actuate said first drive means to feed a mat onto said mat stacking mechanism and thereafter to actuate said second drive means to position the mat upon the stacking area.

20. A machine for handling and stacking in a predetermined stacking area metal fabric mats produced by a mat fabricating machine, said handling and stacking machine comprising a mat accelerating conveyor adapted to receive a mat from the fabricating machine, a mat positioning conveyor mounted adjacent to said mat accelerating conveyor, a first mat support mounted adjacent to said positioning conveyor, said first mat support being pivotally mounted for movement between a first position to receive a mat from said positioning conveyor and a second mat discharging position overlying the stacking area, a second mat support mounted below said first mat support and shiftable between a first position adjacent to the stacking area to a second mat receiving position beneath the second position of said first support and overlying the stacking area, gripping means mounted on said first support and movable between a first mat gripping position and a second non-gripping position, a first drive means to operate said conveyors to move a mat onto said first mat support, and second drive means actuated thereafter simultaneously to move said first and second mat supports between the first and second positions thereof to transfer mats from said positioning conveyor onto the stacking area, said mat supports turning the mats when said gripping means is in said first position and transferring the mats laterally onto the stacking area when said gripping means is in said second position.

21. A machine for handling and stacking in a predetermined stacking area metal fabric mats produced by a mat fabricating machine having a shear control mechanism, said handling and stacking machine comprising a mat accelerating conveyor adapted to receive a mat from the fabricating machine, a mat positioning conveyor mounted adjacent to said mat accelerating conveyor, first drive mechanism to operate said conveyors, a mat stacking mechanism mounted adjacent to said positioning conveyor and the associated stacking area and being operable to move mats from said positioning conveyor onto said stacking area, a second drive mechanism to operate said stacking mechanism, a mat stop assembly mounted on said stacking mechanism and connected to said first drive mechanism to stop said first drive mechanism when a mat is in proper position upon said positioning conveyor, and machine control mechanism connected to the shear control mechanism and operable upon actuation thereof to actuate said first drive means to feed a mat along said conveyors and onto said mat stacking mechanism and thereafter in response to contact of the mat with said mat stop assembly to stop said first drive means and to actuate said second drive means to move the mat upon the stacking area.

22. A conveyor for handling and moving metal fabric mats formed of longitudinal wires and transverse wires having overhangs around the periphery thereof, said conveyor comprising a frame, a plurality of mat supporting rollers mounted on said frame and having the axes thereof disposed substantially horizontally and at an angle with respect to the longitudinal axis of said conveyor whereby to move a mat thereon longitudinally and laterally toward one of the longitudinal edges of said conveyor, control wheels mounted adjacent to said one longitudinal edge, each of said control wheels having a plurality of upwardly extending lugs thereon adapted to be engaged by the longitudinal mat wires with the overhang of the transverse wires passing between said lugs and over at least a portion of said wheel, and drive mechanism for turning said rollers to convey a mat supported thereon longitudinally of said conveyor and against said control wheels.

23. A conveyor for handling and moving metal fabric mats formed of longitudinal wires and transverse wires having overhangs around the periphery thereof, said conveyor comprising a frame, a plurality of mat supporting rollers mounted on said frame and having the axes thereof disposed substantially horizontally and at an angle with respect to the longitudinal axis of said conveyor whereby to move a mat thereon longitudinally and laterally toward one of the longitudinal edges of said conveyors, control wheels mounted adjacent to said one longitudinal edge, each control wheel comprising a plate rotatably mounted upon said frame with the surface thereof inclined at an angle with respect to the horizontal and with the uppermost edge thereof disposed toward a mat on said rollers and therebelow, a plurality of lugs mounted on said plate at an angle with respect thereto so that the uppermost lug adjacent to a mat on said rollers is disposed substantially perpendicularly to engage a longitudinal wire with the overhang of the transverse wires passing therebeyond, and drive mechanism for turning said rollers to convey a mat supported thereon longitudinally of said conveyor and against said control wheels.

24. A conveyor for handling and moving metal fabric mats formed of longitudinal wires and transverse wires having overhangs around the periphery thereof, said conveyor comprising a frame, a plurality of mat supporting rollers mounted on said frame and having the axes thereof disposed substantially horizontally and at an angle with respect to the longitudinal axis of said conveyor whereby to move a mat thereon longitudinally and laterally toward one of the longitudinal edges of said conveyor, deflectors mounted between adjacent rollers and inclined upwardly in the direction of travel of a mat therealong with the uppermost edge of the deflector in alignment vertically with the upper surface of said rollers, control wheels adjacent to said one longitudinal edge, each control wheel comprising a plate rotatably mounted upon said frame with the surface thereof inclined at an angle with respect to the horizontal and with the uppermost edge thereof disposed toward a mat on said rollers and therebelow, a plurality of lugs mounted on said plate at an angle with respect thereto so that the uppermost lug adjacent to a mat on said rollers is disposed substantially perpendicularly to engage a longitudinal wire with the overhang of the transverse wires passing therebeyond, and drive mechanism for turning said rollers to convey a mat supported thereon longitudinally of said conveyor and against said control wheels.

25. A positioning conveyor for use with a mat stacking mechanism including turning arms disposed substantially horizontally to receive a metal fabric mat thereon formed of longitudinal wires and transverse wires having overhangs around the periphery thereof, said conveyor comprising a frame, a plurality of mat supporting rollers mounted on said frame and adapted to receive the turning arms therebetween to position a mat carried on said rollers upon the turning arms, said rollers being disposed substantially horizontally and at an angle with respect to the longitudinal axis of said conveyor whereby to move a mat thereon longiudinally and laterally toward one of the longitudinal edges of said conveyor, control wheels mounted adjacent to said one longitudinal edge and engaging the longitudinal mat wires with the overhang of the transverse wires passing therebeyond, said control wheels being shiftable between a first position to engage a mat on said rollers and a second position disposed below said rollers to permit the turning arms to move the mat across said one longitudinal edge, and drive mechanism for turning said rollers to convey a mat supported thereon longitudinally of said conveyor and against said control wheels.

26. A positioning conveyor for use with a mat stacking mechanism including turning arms disposed substantially horizontally to receive a metal fabric mat thereon formed of longitudinal wires and transverse wires having overhangs around the periphery thereof, said conveyor comprising a frame, a plurality of mat supporting rollers mounted on said frame and adapted to receive the turning arms therebetween to position a mat carried on said rollers upon the turning arms, said rollers being disposed substantially horizontally and at an angle with respect to the longitudinal axis of said conveyor whereby to move a mat thereon longitudinally and laterally toward one of the longitudinal edges of said conveyor, control wheels mounted adjacent to said one longitudinal edge, each of said control wheels including a lever pivotally mounted upon said frame and pivotal between a first upper position and a second lower position, a plate rotatably mounted upon said lever and inclined to the horizontal when said lever is in said first position with the upper edge of said plate disposed toward a mat on said rollers and therebelow, a plurality of lugs mounted on said plate at an angle with respect thereto so that the uppermost lug adjacent to a mat on said rollers is disposed substantially perpendicularly when said lever is in said first position to engage a longitudinal wire with the overhang of the transverse wires passing therebeyond, and drive mechanism for turning said rollers to convey a mat supported thereon longitudinally of said conveyor and against said control wheels.

27. A positioning conveyor for use with a mat stacking mechanism including turning arms disposed substantially horizontally to receive a metal fabric mat thereon formed of longitudinal wires and transverse wires having overhangs around the periphery thereof, said conveyor comprising a frame, a plurality of mat supporting rollers mounted on said frame and adapted to receive the turning arms therebetween to position a mat carried on said rollers upon the turning arms, said rollers being disposed substantially horizontally and at an angle with respect to the longitudinal axis of said conveyor whereby to move a mat thereon longitudinally and laterally toward one of the longitudinal edges of said conveyor, control wheels mounted adjacent to said one longitudinal edge, each of said control wheels including a lever pivotally mounted upon said frame and pivotal between a first upper position and a second lower position, a plate rotatably mounted upon said lever and inclined to the horizontal when said lever is in said first position with the upper edge of said plate disposed toward a mat on said rollers and therebelow, a plurality of lugs mounted on said plate at an angle with respect thereto so that the uppermost lug adjacent to a mat on said rollers is disposed substantially perpendicularly when said lever is in said first position to engage a longitudinal wire with the overhang of the transverse wires passing therebeyond, a transverse control rod mounted on said lever on the end thereof opposite said plate and engageable beneath the associated turning arms, the turning arms holding said lever and said wheel in the first position thereof when the turning arms are in position to receive a mat thereon and upward movement of the turning arms permitting said lever and said control wheel to pivot to the second position thereof, and drive mechanism for turning said rollers to convey a mat supported thereon longitudinally of said conveyor and against said control wheels.

28. A positioning conveyor for use with a mat stacking mechanism including turning arms disposed substantially horizontally to receive a metal fabric mat thereon formed of longitudinal wires and transverse wires having overhangs around the periphery thereof, said conveyor comprising a frame, a plurality of mat supporting rollers mounted on said frame and adapted to receive the turning arms therebetween to position a mat carried on said rollers upon the turning arms, said rollers being disposed substantially horizontally and at an angle with respect to the longitudinal axis of said conveyor whereby to move a mat thereon longitudinally and laterally toward one of the longitudinal edges of said conveyor, control wheels mounted adjacent to said one longitudinal edge and engaging the longitudinal mat wires with the overhang of the transverse wires passing therebeyond, said control wheels being shiftable between a first position to engage a mat on said rollers and a second position disposed below said rollers to permit the turning arms to move the mat across said one longitudinal edge, a stop assembly mounted on the turning arms to engage a transverse wire with the overhang of the longitudinal wires passing thereby, drive mechanism for turning said rollers to convey a mat supported thereon longitudinally of said conveyor and against said control wheels, and control mechanism for said drive mechanism actuated upon contact of a mat with said stop assembly to stop operation of said drive mechanism whereby to position the mat longitudinally upon said rollers and with respect to the associated turning arms.

29. A positioning conveyor as set forth in claim 28, wherein said stop assembly is adjustable longitudinally of said conveyor to accommodate a plurality of sizes of mats thereon and to position the mats in any predetermined position with respect to the associated turning arms.

30. A positioning conveyor as set forth in claim 28, wherein said stop assembly includes a base plate adjustably mounted upon the associated turning arms, a bracket adjustably mounted upon said base plate, a shaft slidably mounted in said bracket, a mat engaging finger mounted on said shaft and depending downwardly therefrom into the path of movement of a mat and pivotal about the axis of said shaft for movement out of the way of a mat moving transversely of said conveyor, means urging said finger and said shaft into mat engaging position, and a control switch actuated by movement of said shaft and connected in said control mechanism and effective when actuated to stop operation of said drive mechanism.

31. A positioning conveyor for use with a mat stacking mechanism including turning arms disposed substantially horizontally to receive a metal fabric mat thereon formed of longitudinal wires and transverse wires having overhangs around the periphery thereof, said conveyor comprising a frame, a plurality of mat supporting rollers mounted on said frame and adapted to receive the turning arms therebetween to position a mat carried on said rollers upon the turning arms, said rollers being disposed substantially horizontally and at an angle with respect to the longitudinal axis of said conveyor whereby to move a mat thereon longitudinally and laterally toward one of the longitudinal edges of said conveyor, deflectors mounted on said frame and disposed between said rollers and the associated turning arms, said deflectors being inclined upwardly in the direction of movement of a mat on said rollers with the uppermost edge thereof disposed in alignment with the upper surface of said rollers, control wheels mounted adjacent to said one longitudinal edge and engaging the longitudinal mat wires with the overhang of the transverse wires passing therebeyond, said control wheels being shiftable between a first position to engage a mat on said rollers and a second position disposed below said rollers to permit the turning arms to move the mat across said one longitudinal edge, and drive mechanism for turning said rollers to convey a mat supported thereon longitudinally of said conveyor and against said control wheels.

32. A turn-transfer unit for stacking mats in a predetermined stacking area comprising a base, a shaft rotatably mounted upon said base, a pair of turning arms having one of the ends thereof fixedly mounted upon said shaft and pivotable between a first horizontal position adjacent to the stacking area and a second horizontal position overlying the stacking area, a pair of transfer slides mounted on said base and slidable from a first position beneath the first position of said arms to a second position overlying the stacking area and below the second position of said arms, each of said arms having a first gripping finger pivotally mounted thereon, a bracket slidably mounted upon each of said arms, a second gripping finger mounted on each of said brackets, drive means to move said gripping fingers between a first mat gripping position and a second non-gripping position, a link interconnecting said turning arms and said transfer slides, and a drive mechanism for turing said shaft to move said arms and said slides between the first and second positions thereof to transfer mats therebetween and onto the stacking area, said unit turning the mats when said gripping fingers are in the first position thereof and transferring the mats laterally when said gripping fingers are in the second position thereof.

33. A turn-transfer unit as set forth in claim 32, wherein said first gripping finger is mounted on the associated turning arm toward said shaft and said bracket is mounted on said turning arm adjacent to the other end thereof, and said drive means for moving said gripping fingers comprises a first hydraulic motor pivotally mounted on the associated turning arm and having the piston rod thereof attached to said first finger and a second hydraulic motor pivotally mounted on said bracket and having the piston rod thereof connected to said second gripping finger.

34. A turn-transfer unit for stacking mats in a predetermed stacking area comprising a base, a shaft rotatably mounted upon said base, a pair of turning arms having one of the ends thereof fixedly mounted upon said shaft and pivotable between a first horizontal position adjacent to the stacking area and a second horizontal position overlying the stacking area, gripping means mounted on said arms and movable between a first mat gripping position and a second non-gripping position, a pair of transfer slides mounted on said base and slidable from a first position beneath the first position of said arms to a second position overlying the stacking area and below the second position of said arms, a roller mounted on said transfer slides between the outer ends thereof, a retainer pivotally mounted on each of said slides adjacent to the outer end thereof and pivotal between a first upstanding retaining position and a second non-retaining position, a link interconnecting said turning arms and said transfer slides, and drive mechanism for turning said shaft to move said arms and said slides between the first and second positions thereof to transfer mats therebetween and onto the stacking area, said unit turning the mats when said gripping fingers are in the first position thereof and transferring the mats laterally when said gripping fingers are in the second position thereof.

35. A turn-transfer unit for stacking mats in a predetermined stacking area comprising a base, a shaft rotatably mounted upon said base, a pair of turning arms having one of the ends thereof fixedly mounted upon said shaft and pivotable between a first horizontal position adjacent to the stacking area and a second horizontal position overlying the stacking area, gripping means mounted on said arms and movable between a first mat gripping position and a second non-gripping position, a pair of transfer slides mounted on said base and slidable from a first position beneath the first position of said arms to a second position overlying the stacking area and below the second position of said arms, a roller mounted on said transfer slides between the outer ends thereof, a retainer pivotally mounted on each of said slides adjacent to the outer end thereof and pivotal between a first upstanding retaining position and a second non-retaining position, a second link pivotally attached to the outer end of said retainer, a control rod pivotally connected to said link and movable with said transfer slide, a first stop mounted on said base in position to engage said control rod as said slides approach the first position thereof to move said retainer to the first position thereof, a second stop mounted on said base in position to engage said control rod as said slides approach the second position thereof to move said retainer to the second position thereof, a link interconnecting said turning arms and said transfer slides, and a drive mechanism for turning said shaft to move said arms and said slides between the first and second positions thereof to transfer mats therebetween and onto the stacking area, said unit turning the mats when said gripping fingers are in the first position thereof and transferring the mats laterally when said gripping fingers are in the second position thereof.

36. A turn-transfer unit for stacking mats in a predetermined stacking area comprising a base, a shaft rotatably mounted upon said base, a pair of turning arms having one of the ends thereof fixedly mounted upon said shaft and pivotable between a first horizontal position adjacent to the stacking area and a second horizontal position overlying the stacking area, gripping means mounted on said arms and movable between a first mat gripping position and a second non-gripping position, a pair of transfer slides mounted on said base and slidable from a first position beneath the first position of said arms to a second position overlying the stacking area and below the second position of said arms, a roller mounted on said transfer slides between the outer ends thereof, a retainer pivotally mounted on each of said slides adjacent to the outer end thereof and pivotal between a first upstanding retaining position and a second non-retaining position, a transfer slide stripper mounted on said base adjacent to said turning shaft to engage the longitudinal wire of a mat on said slides in the second position thereof to hold the mat in proper relationship to the stacking area during movement of said slides from the second to the first positions thereof, a link interconnecting said turning arms and said transfer slides, and a drive mechanism for turning said shaft to move said arms and said slides between the first and second positions thereof to transfer mats therebetween and onto the stacking area, said unit turning the mats when said gripping fingers are in the first position thereof and transferring the mats laterally when said gripping fingers are in the second position thereof.

37. A mat stacking and transferring machine for stacking metal fabric mats comprising a pair of turning arms mounted on a rotatable shaft, a pair of spaced apart transfer slides mounted below said arms, link means interconnecting said arms and said slides, drive means for turning said shaft simultaneously to move said arms and said slides between a first mat receiving position and a second mat stacking position, gripping means mounted on said arms and movable between a first mat gripping position and a second non-gripping position, hydraulic motor means controlling said gripping means, and control mechanism for controlling said hydraulic motor means and said drive means whereby selectively to turn mats and to transfer mats laterally and alternately to turn and transfer mats.

38. A mat stacking and transferring machine for stacking metal fabric mats comprising a pair of spaced apart turning arms mounted on a rotatable shaft, a pair of spaced apart transfer slides mounted below said arms, link means interconnecting said arms and said slides, drive means for turning said shafts simultaneously to move said arms and said slides between a first mat receiving position and a second mat stacking position, gripping means mounted on said arms and movable between a first mat gripping position and a second non-gripping position, a first hydraulic motor controlling said gripping means, a transfer finger mounted adjacent to said arms and movable between a first position engaging the edge of the mat on said arms disposed toward said shaft at a second position on said slide and disposed outwardly from said shaft, a second hydraulic motor controlling said transfer finger, and automatic control mechanism selectively operating said hydraulic motors and said drive means selectively to turn all mats and to transfer all mats and alternately to turn and transfer mats handled by said machine.

39. A machine for handling and stacking metal fabric mats produced by a mat fabricating machine having a shear control mechanism, said stacking machine comprising a mat conveyor adapted to transport a sheared mat, a first drive motor for said mat conveyor, a pair of mat turning arms mounted adjacent to said conveyor to receive a mat conveyed thereto by said conveyor, a shaft connected to said arms, a pair of spaced apart transfer slides mounted below said arms, link means interconnecting said arms and said slides, a second drive motor for turning said shaft simultanously to move said arms and said slides between a first mat receiving position and a second mat stacking position, gripping means mounted on said arms, a first hydraulic motor for moving said gripping means between a first mat gripping position and a second non-gripping position, a transfer finger, a second hydraulic motor carrying said transfer finger and moving the finger between the first retracted position and a second extended position, a second link means interconnecting said slides and said second hydraulic motor to pivot the motor from a first upper position to a second lower position, and an electrical control circuit responsive to actuation of said shear control mechanism to cause operation of said first drive motor and thereafter operation of said second drive motor and selectively to cause actuation of said hydraulic motors to effect mat turning and mat transferring operations and alternate turning and transferring of mats.

40. In a machine for receiving mats and stacking the same in a predetermined stacking location, the combination comprising a first mat support mounted for reciprocating pivotal movement through an arcuate path between a mat receiving position alongside the stacking location and a mat discharging position overlying the stacking location, a second mat support mounted for reciprocating movement into and out of said mat discharging position along a substantially straight-line path beneath said arcuate path of said first mat support, drive means for simultaneously moving said first and second mat supports through their respective paths first in a forward stroke toward said discharge position and then in a return stroke away from said discharge position, mat gripping means on said first mat support, and means for operating said mat gripping means to clamp a mat upon said first mat support during said forward stroke thereof to cause said mat to be carried bodily by said first mat support through said arcuate path from said mat receiving position to said mat discharging position and to cause said mat to be deposited in an upside-down condition upon said second mat support at said mat discharging position, whereupon said deposited mat may drop onto the stacking location when said second mat support is withdrawn from beneath said mat during the return stroke of said second mat support.

41. In a machine for receiving mats and stacking the same in a predetermined stacking location, the combination comprising a first mat support mounted for reciprocating pivotal movement through an arcuate path between a mat receiving position alongside the stacking location and a mat discharging position overlying the stacking location, a second mat support mounted for reciprocating movement into and out of said mat discharging position along a substantially straight-line path beneath said arcuate path of said first mat support, drive means for simultaneously moving said first and second mat supports through their respective paths first in a forward stroke toward said discharge position and then in a return stroke away from said discharge position, mat gripping means on said first mat support, and means for operating said mat gripping means to clamp a mat upon said first mat support during said forward stroke thereof to cause said mat to be carried bodily by said first mat support through said arcuate path from said mat receiving position to said mat discharging position and to cause said mat to be deposited in an upside-down condition upon said second mat support at said mat discharging position, whereupon said deposited mat may drop in an upside-down condition onto the stacking location when said second mat support is withdrawn from beneath said mat during the return stroke of said second mat support, said operating means including means for selectively deactivating said gripping means during said forward stroke of said first mat support so as selectively to provide an alternate mode of operation wherein a mat on said first mat support will be lifted by the pivotal movement thereof during said forward stroke and will slide downwardly off of said first mat support and onto said second mat support for delivery thereby in a face-upright condition to said mat discharging position.

References Cited in the file of this patent

UNITED STATES PATENTS

| | | |
|---|---|---|
| 690,638 | Cottrell | Jan. 7, 1902 |
| 716,999 | George | Dec. 30, 1902 |
| 1,049,435 | Wood | Jan. 7, 1913 |
| 1,353,292 | Swanson | Sept. 21, 1920 |
| 1,587,069 | Edwards | June 1, 1926 |
| 1,870,207 | Washburne | Aug. 2, 1932 |
| 1,933,147 | Paxton | Oct. 31, 1933 |
| 1,946,458 | Evans et al. | Feb. 6, 1934 |
| 2,011,505 | Smith | Aug. 13, 1935 |
| 2,602,537 | Talbot | July 8, 1952 |
| 2,800,992 | Kuper | July 30, 1957 |
| 2,866,562 | Raack et al. | Dec. 30, 1958 |
| 2,909,876 | McGihon | Oct. 27, 1959 |

FOREIGN PATENTS

| | | |
|---|---|---|
| 162,033 | Sweden | Feb. 4, 1958 |